United States Patent
Fan et al.

(10) Patent No.: US 12,441,795 B2
(45) Date of Patent: Oct. 14, 2025

(54) ANTI-ROR1 ANTIBODIES AND PREPARATION METHOD AND USES THEREOF

(71) Applicant: NANJING IMMUNOPHAGE BIOTECH CO., LTD., Nanjing (CN)

(72) Inventors: Guohuang Fan, Shanghai (CN); Jianfei Wang, Shanghai (CN)

(73) Assignee: NANJING IMMUNOPHAGE BIOTECH CO., LTD., Nanjing (CN)

( * ) Notice: Subject to any disclaimer, the term of this patent is extended or adjusted under 35 U.S.C. 154(b) by 874 days.

(21) Appl. No.: 17/763,660

(22) PCT Filed: Sep. 24, 2020

(86) PCT No.: PCT/CN2020/117267
§ 371 (c)(1),
(2) Date: Mar. 25, 2022

(87) PCT Pub. No.: WO2021/057822
PCT Pub. Date: Apr. 1, 2021

(65) Prior Publication Data
US 2022/0356246 A1  Nov. 10, 2022

(30) Foreign Application Priority Data

Sep. 27, 2019 (CN) .......................... 201910929922.3
Jan. 9, 2020 (WO) ................ PCT/CN2020/071114

(51) Int. Cl.
*C07K 16/28* (2006.01)
*A61K 47/68* (2017.01)
*A61K 51/10* (2006.01)
*A61P 35/00* (2006.01)
*G01N 33/574* (2006.01)

(52) U.S. Cl.
CPC ...... *C07K 16/2803* (2013.01); *A61K 47/6849* (2017.08); *A61K 51/1027* (2013.01); *A61P 35/00* (2018.01); *G01N 33/57484* (2013.01); *C07K 2317/21* (2013.01); *C07K 2317/24* (2013.01)

(58) Field of Classification Search
CPC .................................................. C07K 16/2803
See application file for complete search history.

(56) References Cited

U.S. PATENT DOCUMENTS

| | | |
|---|---|---|
| 9,266,952 B2 | 2/2016 | Teige |
| 9,758,586 B2 | 9/2017 | Rader et al. |
| 2018/0142016 A1 | 5/2018 | Wong et al. |

FOREIGN PATENT DOCUMENTS

| | | | |
|---|---|---|---|
| CN | 104817642 B | 8/2015 | |
| CN | 110590951 A | 12/2019 | |
| WO | WO-2016187220 A2 * | 11/2016 | ......... A61K 47/6817 |

* cited by examiner

*Primary Examiner* — Janet L Epps -Smith
*Assistant Examiner* — Nada Ahmed Mahmou Elmansy
(74) *Attorney, Agent, or Firm* — HDLS IPR SERVICES; Chun-Ming Shih

(57) ABSTRACT

The present invention relates to anti-ROR1 antibodies and to methods of using anti-ROR1 antibodies. The anti-ROR1 antibodies described herein are useful for the diagnosis and treatment of diseases, such as various cancers, associated with aberrant expression of ROR1.

20 Claims, 8 Drawing Sheets
Specification includes a Sequence Listing.

| Clone | $K_D$ (M) | Cross activity with mouse ROR1 |
|---|---|---|
| C3 | $3.25 \times 10^{-9}$ | +++ |
| G3 | $4.48 \times 10^{-9}$ | +++ |
| G6 | $4.37 \times 10^{-8}$ | +++ |

C3-VH
QVQLQESGPGLVKPSETLSLTCTVSGGSISSYYWSWIRQLPGKGLEWIGYMHYSGSTSYNPSLKGRLTISVDTSTNQFSLKLGSVTAADTAV
YYCARYYYHDSSGYYSYFDYWGQGTLVTVSS (SEQ ID No: 1)

Kobat:
FR1: QVQLQESGPGLVKPSETLSLTCTVSGGSIS
CDR1: SYYWS  (SEQ ID No: 2)
FR2: WIRQLPGKGLEWIG
CDR2: YMHYSGSTSYNPSLKG  (SEQ ID No: 3)
FR3: RLTISVDTSTNQFSLKLGSVTAADTAVYYCAR
CDR3: YYYHDSSGYYSYFDY  (SEQ ID No: 4)
FR4: WGQGTLVTVSS QVQLQESGPGLVKPSETLSLTCTVSGGSISSYYWSWIRQLPGKGLEWIGYMHYSGSTSYNPSLKGRLTISVDTSTNQFSLKLGSVTAADTAV
YYCARYYYHDSSGYYSYFDYWGQGTLVTVSS (SEQ ID No: 1)
IMGT:
FR1: QVQLQESGPGLVKPSETLSLTCTVS
CDR1: GGSISSYY  (SEQ ID No: 9)
FR2: WSWIRQLPGKGLEWIGY
CDR2: MHYSGST  (SEQ ID No: 10)
FR3: SYNPSLKGRLTISVDTSTNQFSLKLGSVTAADTAVYYC
CDR3: ARYYYHDSSGYYSYFDY  (SEQ ID No: 11)
FR4: WGQGTLVTVSS

Fig. 6

C3-VL
EIVLTQSPGTLSLSPGERATLSCRASQSVSSYLAWYQQKAGQAPRLLIYDASNRASGIPARFSGSGSGTDFTLTISSLEPEDFAVYYCQQRS
NWPPTFGGGTKVEIK (SEQ ID No: 5)
Kobat:
FR1: EIVLTQSPGTLSLSPGERATLSC
CDR1: RASQSVSSYLA  (SEQ ID No: 6)
FR2: WYQQKAGQAPRLLIY
CDR2: DASNRAS  (SEQ ID No: 7)
FR3: GIPARFSGSGSGTDFTLTISSLEPEDFAVYYC
CDR3: QQRSNWPPT  (SEQ ID No: 8)
FR4: FGGGTKVEIK EIVLTQSPGTLSLSPGERATLSCRASQSVSSYLAWYQQKAGQAPRLLIYDASNRASGIPARFSGSGSGTDFTLTISSLEPEDFAVYYCQQRS
NWPPTFGGGTKVEIK (SEQ ID No: 5)
IMGT:
FR1: EIVLTQSPGTLSLSPGERATLSCRAS
CDR1: QSVSSY  (SEQ ID No: 12)
FR2: LAWYQQKAGQAPRLLIY
CDR2: DA  (position 1-2 of SEQ ID No: 13)
FR3: SNRASGIPARFSGSGSGTDFTLTISSLEPEDFAVYYC
CDR3: QQRSNWPPT  (SEQ ID No: 14)
FR4: FGGGTKVEIK

Fig. 7

G3-VH
QVQLQQWGAGLLKPSETLSLTCAVYGGSFSGYYWSWIRQPPGKGLEWIGEINHSGSTSYNPSLKSRVTISVDTSKNQFSLKLSSVTAADTAV
YYCARGHSSGWYRRYFDLWGRGTLVTVSS (SEQ ID No: 15)
Kobat:
FR1: QVQLQQWGAGLLKPSETLSLTCAVYGGSFS
CDR1: GYYWS (SEQ ID No: 16)
FR2: WIRQPPGKGLEWIG
CDR2: EINHSGSTSYNPSLKS (SEQ ID No: 17)
FR3: RVTISVDTSKNQFSLKLSSVTAADTAVYYCAR
CDR3: GHSSGWYRRYFDL (SEQ ID No: 18)
FR4: WGRGTLVTVSS QVQLQQWGAGLLKPSETLSLTCAVYGGSFSGYYWSWIRQPPGKGLEWIGEINHSGSTSYNPSLKSRVTISVDTSKNQFSLKLSSVTAADTAV
YYCARGHSSGWYRRYFDLWGRGTLVTVSS (SEQ ID No: 15)
IMGT:
FR1: QVQLQQWGAGLLKPSETLSLTCAVY
CDR1: GGSFSGYY (SEQ ID No: 23)
FR2: WSWIRQPPGKGLEWIGE
CDR2: INHSGST (SEQ ID No: 24)
FR3: SYNPSLKSRVTISVDTSKNQFSLKLSSVTAADTAVYYC
CDR3: ARGHSSGWYRRYFDL (SEQ ID No: 25)
FR4: WGRGTLVTVSS

Fig. 8

G3-VL
EIVLTQSPATLSLSPGERATLSCRASQSVSSYLAWYQQKPGQAPRLLIYDASNRATGIPAKFSGSGSGTDFTLTISSLEPEDFAVYYCQQRS
NWPPTFGGGTKVEIK (SEQ ID No: 19)

Kobat:
FR1: EIVLTQSPATLSLSPGERATLSC
CDR1: RASQSVSSYLA (SEQ ID No: 20)
FR2: WYQQKPGQAPRLLIY
CDR2: DASNRAT (SEQ ID No: 21)
FR3: GIPAKFSGSGSGTDFTLTISSLEPEDFAVYYC
CDR3: QQRSNWPPT (SEQ ID No: 22)
FR4: FGGGTKVEIK EIVLTQSPATLSLSPGERATLSCRASQSVSSYLAWYQQKPGQAPRLLIYDASNRATGIPAKFSGSGSGTDFTLTISSLEPEDFAVYYCQQRS
NWPPTFGGGTKVEIK (SEQ ID No: 19)
IMGT:
FR1: EIVLTQSPATLSLSPGERATLSCRAS
CDR1: QSVSSY (SEQ ID No: 26)
FR2: LAWYQQKPGQAPRLLIY
CDR2: DA (position 1-2 of SEQ ID No: 27)
FR3: SNRATGIPAKFSGSGSGTDFTLTISSLEPEDFAVYYC
CDR3: QQRSNWPPT (SEQ ID No: 28)
FR4: FGGGTKVEIK

Fig. 9

G6-VH
EVQLVESGGGVVQPGGSLRLSCAASGFTFDDYAMHWVRQAPGKGLEWVSLISGDGGSTYYADSVKGRFTISRDNAKNSLYLQMNSLRAEDTA
VYYCARDNWNDVYYYYGMDVWGQGTTVTVSS (SEQ ID No: 29)

Kobat:
FR1: EVQLVESGGGVVQPGGSLRLSCAASGFTFD
CDR1: DYAMH (SEQ ID No: 30)
FR2: WVRQAPGKGLEWVS
CDR2: LISGDGGSTYYADSVKG (SEQ ID No: 31)
FR3: RFTISRDNAKNSLYLQMNSLRAEDTAVYYCAR
CDR3: DNWNDVYYYYGMDV (SEQ ID No: 32)
FR4: WGQGTTVTVSS EVQLVESGGGVVQPGGSLRLSCAASGFTFDDYAMHWVRQAPGKGLEWVSLISGDGGSTYYADSVKGRFTISRDNAKNSLYLQMNSLRAEDTA
VYYCARDNWNDVYYYYGMDVWGQGTTVTVSS (SEQ ID No: 29)
IMGT:
FR1: EVQLVESGGGVVQPGGSLRLSCAAS
CDR1: GFTFDDYA (SEQ ID No: 37)
FR2: MHWVRQAPGKGLEWVSL
CDR2: ISGDGGST (SEQ ID No: 38)
FR3: YYADSVKGRFTISRDNAKNSLYLQMNSLRAEDTAVYYC
CDR3: ARDNWNDVYYYYGMDV (SEQ ID No: 39)
FR4: WGQGTTVTVSS

Fig. 10

G6-VL
DIQLTQSPSSLSASIGDTVTISCQASRDISDYLNWYQHKPGKAPKLLIYDASNLATGVPSRFSGSGSGTDFTLTIKSLQPEDVATYFCQQDD
LLPLTFGGGTKVDIK (SEQ ID No: 33)

Kobat:
FR1: DIQLTQSPSSLSASIGDTVTISC
CDR1: QASRDISDYLN (SEQ ID No: 34)
FR2: WYQHKPGKAPKLLIY
CDR2: DASNLAT (SEQ ID No: 35)
FR3: GVPSRFSGSGSGTDFTLTIKSLQPEDVATYFC
CDR3: QQDDLLPLT (SEQ ID No: 36)
FR4: FGGGTKVDIK DIQLTQSPSSLSASIGDTVTISCQASRDISDYLNWYQHKPGKAPKLLIYDASNLATGVPSRFSGSGSGTDFTLTIKSLQPEDVATYFCQQDD
LLPLTFGGGTKVDIK (SEQ ID No: 33)
IMGT:
FR1: DIQLTQSPSSLSASIGDTVTISCQAS
CDR1: RDISDY (SEQ ID No: 40)
FR2: LNWYQHKPGKAPKLLIY
CDR2: DA (position 1-2 of SEQ ID No: 41)
FR3: SNLATGVPSRFSGSGSGTDFTLTIKSLQPEDVATYFC
CDR3: QQDDLLPLT (SEQ ID No: 42)
FR4: FGGGTKVDIK

Fig. 11

ANTI-ROR1 ANTIBODIES AND PREPARATION METHOD AND USES THEREOF

TECHNICAL FIELD

The invention relates to the field of biomedical or biopharmaceutical technology and particularly to anti-ROR1 antibodies, preparation method and uses thereof.

BACKGROUND OF THE INVENTION

The receptor tyrosine kinase like orphan receptor 1 (ROR1) belong to a family of receptor tyrosine kinase, including ROR1 and ROR2. ROR1 and ROR2 are strongly expressed during fetal and embryonic development, but to a lesser extent in tissues of healthy adults. RORs are known to regulate several cellular processes including cell division, proliferation, migration, and chemotaxis, via the activation of planar cell polarity (PCP) and $Ca^{2+}$ pathways from non-canonical Wnt signaling. Both ROR receptors share a common molecular structure consisting of an extracellular domain (ECD) composed of an Ig-like, cysteine rich domain (CRD) and Kringle domain; a transmembrane domain; and an intracellular domain (ICD), consisting of a tyrosine kinase-like domain, followed by two serine/threonine domains flanking a proline-rich domain at the end of the ICD. Wnt5a from the non-canonical Wnt pathway has been shown to bind to ROR1 and ROR2 and induce receptor heterodimerization, although more studies are needed on ROR homo- or heterodimerization mechanisms in different cellular models. Moreover, other Wnt ligands have been shown to interact with either ROR1 or ROR2 in various cellular contexts, such as Wnt16-ROR1 interaction in TCF3-PBX1 B-cell acute lymphoblastic leukemia.

While ROR1 expression is present during normal embryonic and fetal development, it is absent within most mature tissues. A low level of ROR1 expression is seen in adipose tissue and to a lesser degree in the pancreas, lung, and a subset of intermediate B cells. However, the expression of ROR1 has been seen in numerous blood and solid malignancies, such as chronic lymphocytic leukemia (CLL), mantle cell lymphoma (MCL), as well as ovarian, breast, prostate, lung, melanoma and colorectal cancers. The high expression of ROR1 in tumor cells is known to contribute to an enhanced rate of cell survival, proliferation, migration and chemotaxis. The binding of Wnt5a ligand leads to ROR1 receptor dimerization and the recruitment of various adaptor proteins that trigger the activation of downstream Rho/Rac1 GTPases, PI3K/AKT and the Hippo-YAP/TAZ pathway, contributing to several biological processes which ultimately lead to tumor progression and chemoresistance.

Metastasis and chemoresistance are the challenges of cancer therapy. Recently, strong evidence has associated ROR1 expression with cancer stem cells (CSCs), epithelial-mesenchymal transition (EMT) and chemoresistance, making this receptor a critical factor in tumor metastasis and recurrence. Interestingly, in tumors such as breast cancer, enhanced ROR1 expression promotes tumorigenesis through the upregulation of YAP/TAZ transcription and/or polycomb complex protein BMI-1 expression. This indicates new crosstalk by which the non-canonical Wnt pathway, via Wnt5a-ROR1 engagement, could sustain malignant transformation (Karvonen et al., Cells 2019 Aug. 2; 8(8)).

The important role of ROR1 in cancer development and metastasis has led investigators to examine the functional advantage conferred to cancer by ROR1 expression and to explore the use of immune-based therapies against ROR1 for targeting cancer cells. Therefore, ROR1 is a tumor-associated/tumor-specific antigen and anti-ROR1 monoclonal antibodies (mAbs) can be used as potential anti-cancer therapeutics. One of the most important strategies targeting ROR1 is to develop monoclonal antibodies against this receptor, which have demonstrated promising preclinical efficacy.

Summing up, there is a need in the art for more effective therapeutics comprising anti-ROR1 antibodies that effectively inhibit the ROR1 activity while causing minimal adverse side effects in humans.

SUMMARY OF THE INVENTION

The purpose of the invention is to provide anti-ROR1 antibodies or antigen-binding fragments thereof that specifically bind ROR1 and/or effectively inhibit the ROR1 activity.

The present invention is based on anti-ROR1 antibodies. Such antibodies may be used to target cells expressing ROR1 for therapeutic and diagnostic purposes.

In the first aspect, it provides isolated monoclonal antibody or antigen-binding fragment thereof comprising a heavy chain complementarity determining region 1 (HCDR1), HCDR2, HCDR3, a light chain complementarity determining region1 (LCDR1), LCDR2, and LCDR3. The polypeptide sequences of HCDR1, HCDR2, HCDR3, LCDR1, LCDR2, and LCDR3 have selected from the group consisting of:
  a. SEQ ID NOs: 2, 3, 4, 6, 7 and 8; or
  b. SEQ ID NOs: 16, 17, 18, 20, 21 and 22; or
  c. SEQ ID NOs: 30, 31, 32, 34, 35 and 36;
  wherein the antibody or antigen-binding fragment thereof specifically binds receptor tyrosine kinase-like orphan receptor 1 (ROR1), preferably human ROR1; and
  any of the above amino acid sequences further includes a derivative sequence formed by optionally addition, deletion, modification, and/or substitution of 1-5 (or 1, 2, 3) amino acids, and capable of retaining ROR1 binding affinity.

The present invention also provides isolated monoclonal antibody or antigen-binding fragment thereof comprising a heavy chain complementarity determining region 1 (HCDR1), HCDR2, HCDR3, a light chain complementarity determining region1 (LCDR1), LCDR2, and LCDR3. The polypeptide sequences of HCDR1, HCDR2, HCDR3, LCDR1, LCDR2, and LCDR3 have selected from the group consisting of
  a. SEQ ID NOs: 9, 10, 11, 12, position 1-2 of SEQ ID No: 13 (DA), and SEQ ID No: 14; or
  b. SEQ ID NOs: 23, 24, 25, 26, position 1-2 of SEQ ID No: 27 (DA), and SEQ ID No: 28; or
  c. SEQ ID NOs: 37, 38, 39, 40, position 1-2 of SEQ ID No: 41 (DA), and SEQ ID No: 42;
  wherein the antibody or antigen-binding fragment thereof specifically binds ROR1, preferably human ROR1; and
  any of the above amino acid sequences further includes a derivative sequence formed by optionally addition, deletion, modification, and/or substitution of 1-5 (or 1, 2, 3) amino acids, and capable of retaining ROR1 binding affinity.

In preferred embodiments, the heavy chain further includes a heavy chain constant region and/or the light chain further includes a light chain constant region.

In preferred embodiments, the ratio (F1/F0) of the affinity F1 of the derived antibody against ROR1 and the affinity F0 of the corresponding non-derived antibody against ROR1 is 0.5-2, preferably 0.7-1.5 and more preferably 0.8-1.2.

In preferred embodiments, the number of the added, deleted, modified and/or substituted amino acids in 3 HCDRs and 3 LCDRs of the antibody is 1-5 (such as 1-3, preferably 1-2, more preferably 1).

In preferred embodiments, the heavy chain variable region of the antibody further comprises a human or humanized framework region, and/or the light chain variable region of the antibody further comprises a human or humanized framework region.

In preferred embodiments, the antibody is a double-chain antibody or a single-chain antibody.

In preferred embodiments, the antibody is a full-length antibody protein or an antigen-binding fragment.

In preferred embodiments, the antibody is a bispecific antibody or a multispecific antibody.

In preferred embodiments, the antibody is in the form of a drug conjugate.

In preferred embodiments, the polypeptide sequences of isolated monoclonal antibody or antigen-binding fragment thereof have selected from the group consisting of:
a. a heavy chain variable region having the polypeptide sequence of SEQ ID NO: 1, and a light chain variable region having the polypeptide sequence of SEQ ID NO: 5; or
b. a heavy chain variable region having the polypeptide sequence of SEQ ID NO: 15, and a light chain variable region having the polypeptide sequence of SEQ ID NO: 19; or
c. a heavy chain variable region having the polypeptide sequence of SEQ ID NO: 29, and a light chain variable region having the polypeptide sequence of SEQ ID NO: 33.

In preferred embodiments, the isolated monoclonal antibody or antigen-binding fragment thereof is chimeric. In preferred embodiments, the isolated monoclonal antibody or antigen-binding fragment thereof is human or humanized.

In preferred embodiments, the isolated monoclonal antibody is human anti-ROR1 antibody.

In a preferred embodiment, the antibody is an ROR1 specific antibody capable of binding Ig-like domain or Kringle domain of ROR1.

In preferred embodiments, the isolated monoclonal antibody or antigen-binding fragment thereof comprises a heavy chain variable region having a polypeptide sequence at least ($\geq$) 85%, at least 90%, at least 95%, at least 96%, at least 97%, at least 98%, or at least 99% identical to SEQ ID NO: 1, 15, or 29, or a light chain variable region having a polypeptide sequence at least 85%, at least 90%, at least 95%, at least 96%, at least 97%, at least 98%, or at least 99% identical to SEQ ID NO: 5, 19, or 33.

In particular preferred embodiments, the $V_H$ chain and the $V_L$ chain of the ROR1 specific antibodies have at least 80%, preferably at least 90%, more preferably at least 95%, and even more preferably at least 99% sequence identity respectively with the amino acid sequence of SEQ ID NO: 1 ($V_H$) and SEQ ID NO: 5 ($V_L$).

In particular preferred embodiments, the $V_H$ chain and the $V_L$ chain of the ROR specific antibodies have at least 80%, preferably at least 90%, more preferably at least 95%, and even more preferably at least 99% sequence identity respectively with the amino acid sequence of SEQ ID NO: 15 ($V_H$) and SEQ ID NO: 19 ($V_L$).

In particular preferred embodiments, the $V_H$ chain and the $V_L$ chain of the ROR1 specific antibodies have at least 80%, preferably at least 90%, more preferably at least 95%, and even more preferably at least 99% sequence identity respectively with the amino acid sequence of SEQ ID NO: 29 ($V_H$) and SEQ ID NO: 33 ($V_L$).

In other particular preferred embodiments, the ROR specific antibody is an IgA, an IgD, an IgE, an IgG, or an IgM.

In another preferred embodiment, the ROR1 specific antibody is selected from the group consisting of: (i) a single chain antibody, a single-chain variable fragment (scFv), a univalent antibody lacking a hinge region or a minibody; (ii) a Fab, Fab' or F(ab')$_2$ fragment; (iii) a whole antibody; and (iv) an antibody that comprises a human IgG Fc domain.

In another preferred embodiment, the ROR1 specific antibody is an IgG selected from the group consisting of IgG1, IgG2, IgG3, IgG4, and synthetic IgG.

In the second aspect, it provides a recombinant protein (or polypeptide) which comprises:
(i) the antibody or antigen-binding fragment thereof according to the first aspect of the invention; and
(ii) optional tag sequences to assist expression and/or purification.

In preferred embodiments, the tag sequence comprises a 6His tag.

In preferred embodiments, the recombinant protein (or polypeptide) includes a fusion protein.

In preferred embodiments, the recombinant protein is a monomer, a dimer, or a multimer.

In the third aspect, it provides isolated nucleic acids encoding the monoclonal antibodies or antigen-binding fragments in the first aspect, or the recombinant protein in the second aspect of the invention.

In the fourth aspect, it provides a vector which comprises the isolated nucleic acids encoding the monoclonal antibodies or antigen-binding fragments in the first aspect, or the recombinant protein in the second aspect of the invention.

In preferred embodiments, the vector comprises bacterial plasmids, phages, yeast plasmid, plant cell virus, mammalian cell virus such as adenovirus, lentivirus, retrovirus, or other vectors.

In the fifth aspect, it provides an engineered host cell, which comprises the nucleic acids of the third aspect in its genome, or comprises a vector of the fourth aspect.

In preferred embodiments, the host cell comprises immune cell, preferably T-cell, or NK cell.

In the sixth aspect, it provides an antibody conjugate which comprises:
(i) an antibody moiety selected from the group consisting of an antibody or antigen-binding fragment thereof in the first aspect of the invention, or a recombinant protein in the fifth aspect of the invention, or a combination thereof; and
(ii) a coupling moiety coupled to the antibody moiety, wherein the coupling moiety is selected from the group consisting of a detectable label, a drug, a toxin, a cytokine, a radionuclide, an enzyme, or a combination thereof.

In another preferred example, the antibody moiety and the coupling moiety are coupled by a chemical bond or a linker.

In the seventh aspect of the present invention, it provides an immune cell which expresses an antibody or antigen-binding fragment thereof in the first aspect of the invention.

In preferred embodiments, the antibody is exposed as a cell membrane protein in which the antibody is as an extracellular element. Preferably, the antibody is in a form of scFv.

In preferred embodiments, the immune cell comprises NK cell and T cell.

In preferred embodiments, the immune cell is autologous or allogeneic.

In preferred embodiments, the immune cell is CAR-T cell.

In the eighth aspect of invention, it provides a pharmaceutical composition which comprises (i) the isolated monoclonal antibody or antigen-binding fragment thereof in the first aspect, the recombinant protein in the second aspect, the isolated nucleic acids (especially DNA or RNA) in the third aspect, the vector in the fourth aspect, the antibody conjugate in the sixth aspect, the immune cell in the seventh aspect, or combinations thereof, and (ii) a pharmaceutically acceptable carrier.

In preferred embodiments, the pharmaceutical composition is a liquid preparation.

In preferred embodiments, the pharmaceutical composition is an injection.

In the ninth aspect of invention, it provides a use of an active ingredient for (a) preparation of a diagnostic reagent or kit; and/or (b) preparation of a medicament for the prevention and/or treatment of a disease associated with abnormal expression or function of ROR1, wherein the active ingredient is selected from the group consisting of the isolated monoclonal antibody or antigen-binding fragment thereof in the first aspect, the recombinant protein in the second aspect, the isolated nucleic acids (especially DNA or RNA) in the third aspect, the vector in the fourth aspect, the antibody conjugate in the sixth aspect, the immune cell in the seventh aspect, and combinations thereof.

In preferred embodiments, the diagnostic reagent is a test strip or a test plate.

In preferred embodiments, the disease associated with abnormal expression or function of ROR1 comprises cancer.

In preferred embodiments, the cancer is a ROR1 positive cancer.

In a preferred embodiment, the cancer comprises non-solid tumor.

In a preferred embodiment, the cancer is hematological malignancy.

In a particular preferred embodiment, the hematological malignancy is chronic lymphocyte leukemia (CLL) or acute lymphocytic leukemia (ALL).

In a preferred embodiment, the cancer comprises solid tumor.

In a particular preferred embodiment, the solid tumor comprises breast cancer, prostate cancer, liver cancer, lung cancer, pancreatic cancer, colon cancer, melanoma, ovarian cancer, or kidney cancer.

In preferred embodiments, the diagnostic reagent or kit is used for:
(1) detecting ROR1 protein in a sample; and/or
(2) detecting endogenous ROR1 protein in tumor cells; and/or
(3) detecting tumor cells expressing ROR1 protein.

In preferred embodiments, the antibody is in the form of an antibody-drug conjugate (ADC).

In the tenth aspect of the present invention, it provides a method for in vitro detection (including diagnostic or non-diagnostic detection) of a ROR1 protein in a sample which comprises:
(1) contacting the sample in vitro with an antibody in the fifth aspect of the invention; and
(2) detecting whether an antigen-antibody complex is formed, where the formation of the complex indicates the presence of ROR1 protein in the sample.

In the eleventh aspect of the present invention, it provide a kit which comprises:
(1) a first container containing the antibody of the present invention as a first antibody; and
(2) a second container containing a secondary antibody against the first antibody of the present invention.

In the twelfth aspect of the present invention, it provides a method for preparing a recombinant polypeptide, which comprises:
(a) culturing an engineered host cell in the fifth aspect of the invention under conditions suitable for expression; and
(b) isolating a recombinant polypeptide from the culture, wherein the recombinant polypeptide is an monoclonal antibody or antigen-binding fragment thereof in the first aspect, or the recombinant protein in the second aspect.

In a thirteenth aspect of the present invention, it provide a combination of medicine which comprises:
(I) a first active ingredient, which is selected from the group consisting of the isolated monoclonal antibody or antigen-binding fragment thereof in the first aspect, the recombinant protein in the second aspect, the isolated nucleic acids (especially DNA or RNA) in the third aspect, the vector in the fourth aspect, the antibody conjugate in the sixth aspect, the immune cell in the seventh aspect, and combinations thereof;
(ii) a second active ingredient which is a second antibody, or a chemotherapeutic agent.

In another preferred example, the second antibody is selected from the group consisting of a CTLA4 antibody, a PD-1 antibody, a PD-L1 antibody, a 4-1BB antibody, and combinations thereof.

In another preferred example, the chemotherapeutic agent is selected from the group consisting of docetaxel, carboplatin, or combinations thereof.

In a fourteenth aspect of the present invention, it provides a method for treating a disease associated with abnormal expression or dysfunction of ROR1, which comprises administering an effective amount of the isolated monoclonal antibody or antigen-binding fragment thereof in the first aspect, the recombinant protein in the second aspect, the isolated nucleic acids (especially DNA or RNA) in the third aspect, the vector in the fourth aspect, the antibody conjugate in the sixth aspect, the immune cell in the seventh aspect, or the pharmaceutical composition in the eighth aspect or combinations thereof, to a subject in need.

In preferred embodiments, the disease related to ROR1 expression or dysfunction is cancer.

In preferred embodiments, the method further comprises: administering a safe and effective amount of a second antibody to the subject before, during and/or after the first active ingredient is administered.

In a preferred embodiment, the cancer comprises non-solid tumor.

In a preferred embodiment, the cancer is hematological malignancy.

In a particular preferred embodiment, the hematological malignancy is chronic lymphocyte leukemia (CLL) or acute lymphocytic leukemia (ALL).

In a preferred embodiment, the cancer comprises solid tumor.

In a particular preferred embodiment, the solid tumor is breast cancer, prostate cancer, liver cancer, lung cancer, pancreatic cancer, colon cancer, melanoma, ovarian cancer, or kidney cancer.

In the fifteenth aspect, it provides a method of determining a level of ROR1 in a subject which comprise (a) obtaining a sample from the subject; (b) contacting the sample with an isolated monoclonal antibody or antigen-binding fragment thereof of the invention; and (c) determining a level of ROR1 in the subject. Preferably, the sample is a tissue sample or a blood sample and the tissue sample can be a cancer tissue sample.

BRIEF DESCRIPTION OF THE DRAWINGS

FIG. 2 comprise FIGS. 2A and 2B. which show the results of ELISA binding analysis using ROR1 antibodies.

FIG. 5 comprise FIGS. 5A and 5B. which show the binding of mAbs to different ROR extracellular domain.

FIGS. 6 and 7 show the amino acid sequence of $V_H$ and $V_L$ of antibody clone C3, wherein the CDRs are underlined.

FIGS. 8 and 9 show the amino acid sequence of $V_H$ and $V_L$ of antibody clone G3, wherein the CDRs are underlined.

FIGS. 10 and 11 show the amino acid sequence of $V_H$ and $V_L$ of antibody clone G6, wherein the CDRs are underlined.

DETAILED DESCRIPTION OF THE INVENTION

Figure 1:
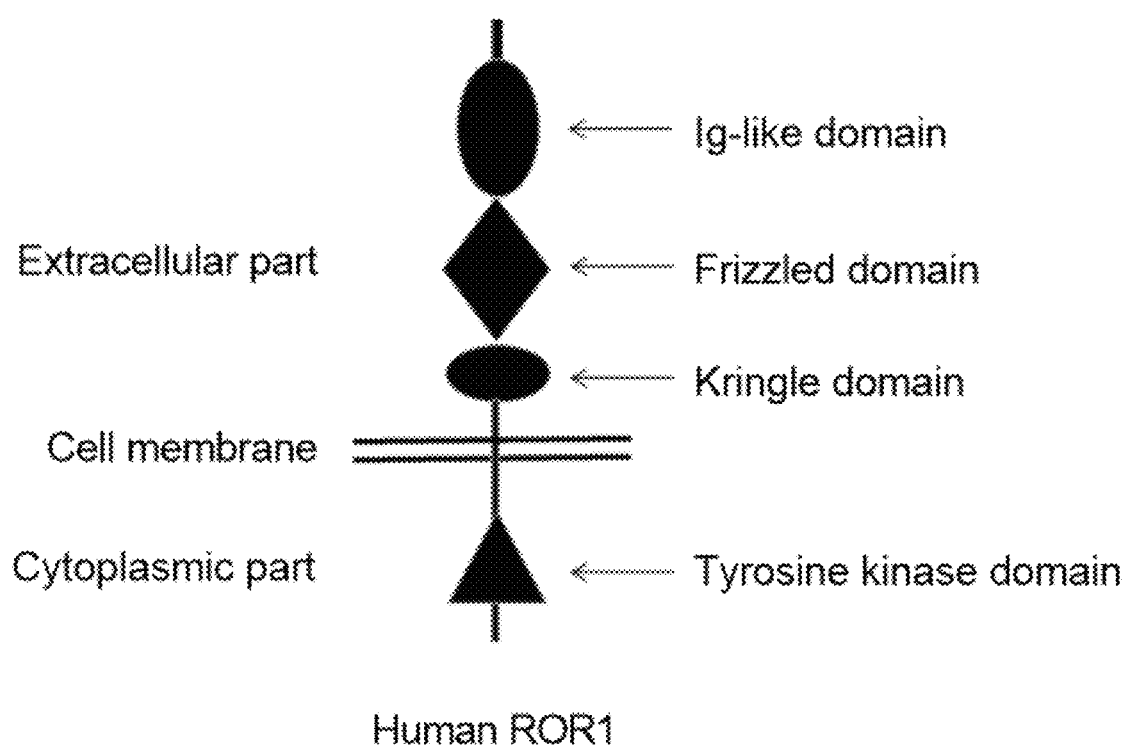
FIG. 1 shows a schematic structure of human ROR1, including the Ig-, Frizzled-, and Kringle-like domains of receptor tyrosine kinase-like orphan receptor 1 (ROR1), and an ROR1-derived extracellular domain fragment (ROR1-ECD), as well as the transmembrane and intracellular tyrosine kinase domains of ROR1.

Through extensive and intensive research and extensive screening, the inventors unexpectedly obtained a set of fully human ROR1 antibodies with a completely new amino acid sequence. The ROR antibodies of the present invention have excellent high affinity with human ROR1 protein, have extremely low immunogenicity or even no immunogenicity to human, thus is useful for treating ROR1-related diseases such as tumors. The present invention has been completed on this basis.

Terms

Unless defined otherwise, all technical and scientific terms used herein have the same meaning as commonly understood to one of ordinary skill in the art to which this invention pertains. Otherwise, certain terms used herein have the meanings as set forth in the specification.

It must be noted that as used herein and in the appended claims, the singular forms "a", "an", and "the" include plural reference unless the context clearly dictates otherwise.

Unless otherwise stated, any numerical values, such as a concentration or a concentration range described herein, are to be understood as being modified in all instances by the term "about." Thus, a numerical value typically includes ±10% of the recited value. For example, a concentration of 1 mg/mL includes 0.9 mg/mL to 1.1 mg/mL. Likewise, a concentration range of 1% to 10% (w/v) includes 0.9% (w/v) to 11% (w/v). As used herein, the use of a numerical range expressly includes all possible subranges, all individual numerical values within that range, including integers within such ranges and fractions of the values unless the context clearly indicates otherwise.

Unless otherwise indicated, the term "at least" preceding a series of elements is to be understood to refer to every element in the series. Those skilled in the art will recognize or be able to ascertain using no more than routine experimentation, many equivalents to the specific embodiments of the invention described herein. Such equivalents are intended to be encompassed by the invention.

As used herein, the terms "comprises", "comprising", "includes", "including", "has", "having", "contains" or "containing", or any other variation thereof, will be understood to imply the inclusion of a stated integer or group of integers but not the exclusion of any other integer or group of integers and are intended to be non-exclusive or open-ended. For example, a composition, a mixture, a process, a method, an article, or an apparatus that comprises a list of elements is not necessarily limited to only those elements but can include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following. A is true (or present) and B is false (or not present), A is false (or not present) and B is true (or present), and both A and B are true (or present).

As used herein, the conjunctive term "and/or" between multiple recited elements is understood as encompassing both individual and combined options. For instance, where two elements are conjoined by "and/or", a first option refers to the applicability of the first element without the second. A second option refers to the applicability of the second element without the first. A third option refers to the applicability of the first and second elements together. Any one of these options is understood to fall within the meaning, and therefore satisfy the requirement of the term "and/or" as used herein. Concurrent applicability of more than one of the options is also understood to fall within the meaning, and therefore satisfy the requirement of the term "and/or."

As used herein, the term "consists of", or variations such as "consist of" or "consisting of", as used throughout the specification and claims, indicate the inclusion of any recited integer or group of integers, but that no additional integer or group of integers can be added to the specified method, structure, or composition.

As used herein, the term "consists essentially of", or variations such as "consist essentially of" or "consisting essentially of", as used throughout the specification and claims, indicate the inclusion of any recited integer or group of integers, and the optional inclusion of any recited integer or group of integers that do not materially change the basic or novel properties of the specified method, structure or composition. See M.P.E.P. § 2111.03.

As used herein, "subject" means any animal, preferably a mammal, most preferably a human. The term "mammal" as used herein, encompasses any mammal. Examples of mammals include, but are not limited to, cows, horses, sheep, pigs, cats, dogs, mice, rats, rabbits, guinea pigs, monkeys, humans, etc., more preferably a human.

The words "right", "left", "lower", and "upper" designate directions in the drawings to which reference is made.

It should also be understood that the terms "about", "approximately", "generally", "substantially", and like terms, used herein when referring to a dimension or characteristic of a component of the preferred invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

The terms "identical" or percent "identity", in the context of two or more nucleic acids or polypeptide sequences (e.g., anti-ROR1 antibodies and polynucleotides that encode them, ROR1 polypeptides and ROR1 polynucleotides that encode them), refer to two or more sequences or subsequences that are the same or have a specified percentage of amino acid residues or nucleotides that are the same, when compared and aligned for maximum correspondence, as measured using one of the following sequence comparison algorithms or by visual inspection.

For sequence comparison, typically one sequence acts as a reference sequence, to which test sequences are compared. When using a sequence comparison algorithm, test and reference sequences are input into a computer, subsequence coordinates are designated, if necessary, and sequence algorithm program parameters are designated. The sequence comparison algorithm then calculates the percent sequence identity for the test sequence(s) relative to the reference sequence, based on the designated program parameters.

Optimal alignment of sequences for comparison can be conducted, e.g., by the local homology algorithm of Smith & Waterman, Adv. Appl. Math. 2:482 (1981), by the homology alignment algorithm of Needleman & Wunsch, J. Mol. Biol. 48:443 (1970), by the search for similarity method of Pearson & Lipman, Proc. Nat'l. Acad. Sci. USA85:2444 (1988), by computerized implementations of these algorithms (GAP, BESTFIT, FASTA, and TFASTA in the Wisconsin Genetics Software Package, Genetics Computer Group, 575 Science Dr., Madison, WI), or by visual inspection (see generally, Current Protocols in Molecular Biology, F. M. Ausubel et al., eds., Current Protocols, a joint venture between Greene Publishing Associates, Inc. and John Wiley & Sons, Inc., (1995 Supplement) (Ausubel)).

Examples of algorithms that are suitable for determining percent sequence identity and sequence similarity are the BLAST and BLAST 2.0 algorithms, which are described in Altschul et al. (1990) J. Mol. Biol. 215: 403-410 and Altschul et al. (1997) Nucleic Acids Res. 25: 3389-3402, respectively. Software for performing BLAST analyses is publicly available through the National Center for Biotechnology Information. This algorithm involves first identifying high scoring sequence pairs (HSPs) by identifying short words of length W in the query sequence, which either match or satisfy some positive-valued threshold score T when aligned with a word of the same length in a database sequence. T is referred to as the neighborhood word score threshold (Altschul et al, supra). These initial neighborhood word hits act as seeds for initiating searches to find longer HSPs containing them. The word hits are then extended in both directions along each sequence for as far as the cumulative alignment score can be increased. Cumulative scores are calculated using, for nucleotide sequences, the parameters M (reward score for a pair of matching residues; always >0) and N (penalty score for mismatching residues; always <0). For amino acid sequences, a scoring matrix is used to calculate the cumulative score. Extension of the word hits in each direction are halted when: the cumulative alignment score falls off by the quantity X from its maximum achieved value; the cumulative score goes to zero or below, due to the accumulation of one or more negative-scoring residue alignments; or the end of either sequence is reached. The BLAST algorithm parameters W, T, and X determine the sensitivity and speed of the alignment. The BLASTN program (for nucleotide sequences) uses as defaults a wordlength (W) of 11, an expectation (E) of 10, M=5, N=−4, and a comparison of both strands. For amino acid sequences, the BLASTP program uses as defaults a wordlength (W) of 3, an expectation (E) of 10, and the BLOSEIM62 scoring matrix (see Henikoff & Henikoff, Proc. Natl. Acad. Sci. ETSA 89: 10915 (1989)).

In addition to calculating percent sequence identity, the BLAST algorithm also performs a statistical analysis of the similarity between two sequences (see, e.g., Karlin & Altschul, Proc. NatT. Acad. Sci. ETSA 90:5873-5787 (1993)). One measure of similarity provided by the BLAST algorithm is the smallest sum probability (P(N)), which provides an indication of the probability by which a match between two nucleotide or amino acid sequences would occur by chance. For example, a nucleic acid is considered similar to a reference sequence if the smallest sum probability in a comparison of the test nucleic acid to the reference nucleic acid is less than about 0.1, more preferably less than about 0.01, and most preferably less than about 0.001.

A further indication that two nucleic acid sequences or polypeptides are substantially identical is that the polypeptide encoded by the first nucleic acid is immunologically cross reactive with the polypeptide encoded by the second nucleic acid, as described below. Thus, a polypeptide is typically substantially identical to a second polypeptide, for example, where the two peptides differ only by conservative substitutions. Another indication that two nucleic acid sequences are substantially identical is that the two molecules hybridize to each other under stringent conditions.

The term "polynucleotide" as used herein is defined as a chain of nucleotides. Furthermore, nucleic acids are polymers of nucleotides. Thus, nucleic acids and polynucleotides as used herein are interchangeable. One skilled in the art has the general knowledge that nucleic acids are polynucleotides, which can be hydrolyzed into the monomeric "nucleotides." The monomeric nucleotides can be hydrolyzed into nucleosides. As used herein polynucleotides include, but are not limited to, all nucleic acid sequences which are obtained by any means available in the art, including, without limitation, recombinant means, i.e., the cloning of nucleic acid sequences from a recombinant library or a cell genome, using ordinary cloning technology and PCR™, and the like, and by synthetic means.

As used herein, the terms "peptide", "polypeptide", and "protein" are used interchangeably, and refer to a compound comprised of amino acid residues covalently linked by peptide bonds. A protein or peptide must contain at least two amino acids, and no limitation is placed on the maximum number of amino acids that can comprise a protein's or peptide's sequence. Polypeptides include any peptide or protein comprising two or more amino acids joined to each other by peptide bonds. As used herein, the term refers to both short chains, which also commonly are referred to in the art as peptides, oligopeptides and oligomers, for example, and to longer chains, which generally are referred to in the art as proteins, of which there are many types. "Polypeptides" include, for example, biologically active fragments, substantially homologous polypeptides, oligopeptides, homodimers, heterodimers, variants of polypeptides, modified polypeptides, derivatives, analogs, fusion proteins, among others. The polypeptides include natural peptides, recombinant peptides, synthetic peptides, or a combination thereof.

The term "antigen-binding fragment" as used herein refers to a polypeptide fragment that contains at least one CDR of an immunoglobulin heavy and/or light chain that binds to the antigen of interest, which antigen in particularly preferred embodiments described herein is the receptor tyrosine kinase-like orphan receptor 1 (ROR1). In this regard, an antigen-binding fragment of the herein described antibodies may comprise one, two, three, four, five or all six CDRs of a $V_H$ and/or $V_L$ sequence set forth herein from antibodies that bind ROR1. An antigen-binding fragment of the herein described ROR1-specific antibodies is capable of binding to ROR1. In other embodiments, binding of an antigen-binding fragment prevents or inhibits binding of ROR1 ligand(s) to the ROR1 receptor, interrupting the biological response that would otherwise result from ligand binding to the receptor. In certain embodiments, the antigen-binding fragment binds specifically to and/or inhibits or modulates the biological activity of ROR1.

The term "antigen" refers to a molecule or a portion of a molecule capable of being bound by a selective binding agent, such as an antibody, and additionally capable of being used in an animal to produce antibodies capable of binding to an epitope of that antigen. An antigen may have one or more epitopes.

The term "epitope" includes any determinant, preferably a polypeptide determinant, that is capable of specific binding to an immunoglobulin or T-cell receptor. An epitope is a region of an antigen that is bound by an antibody. In certain embodiments, epitope determinants include chemically active surface groupings of molecules such as amino acids, sugar side chains, phosphoryl or sulfonyl, and may in certain embodiments have specific three-dimensional structural characteristics, and/or specific charge characteristics. In certain embodiments, an antibody is said to specifically bind an antigen when it preferentially recognizes its target antigen in a complex mixture of proteins and/or macromolecules. An antibody may according to certain embodiments be said to bind an antigen specifically when the equilibrium dissociation constant for antibody-antigen binding is less than or equal to $10^{-6}$ M, or less than or equal to $10^{-7}$ M, or less than or equal to $10^{-8}$ M. In some embodiments, the equilibrium dissociation constant may be less than or equal to $10^{-9}$ M or less than or equal to $10^{-10}$ M.

The term "vector" is used to refer to any molecule (e.g., nucleic acid, plasmid, or virus) used to transfer coding information to a host cell. The term "expression vector" refers to a vector that is suitable for transformation of a host cell and contains nucleic acid sequences that direct and/or control expression of inserted heterologous nucleic acid sequences. Expression includes, but is not limited to, processes such as transcription, translation, and RNA splicing, if introns are present.

Antibodies

The invention generally relates to isolated anti-ROR1 antibodies, nucleic acids and expression vectors encoding the antibodies, recombinant cells containing the vectors, and compositions comprising the antibodies. Methods of making the antibodies, and methods of using the antibodies to treat diseases including cancer are also provided. The antibodies of the invention possess one or more desirable functional properties, including but not limited to high-affinity binding to ROR1, high specificity to ROR1, and the ability to inhibit tumor growth in subjects in need thereof and in animal models when administered alone or in combination with other anti-cancer therapies.

In a general aspect, the invention relates to isolated monoclonal antibody or antigen-binding fragment thereof that specifically bind ROR1.

As used herein, the term "antibody" is used in a broad sense and includes immunoglobulin or antibody molecules including human, humanized, composite and chimeric antibodies and antibody fragments that are monoclonal or polyclonal. In general, antibodies are proteins or peptide chains that exhibit binding specificity to a specific antigen. Antibody structures are well known. Immunoglobulins can be assigned to five major classes (i.e., IgA, IgD, IgE, IgG and IgM), depending on the heavy chain constant domain amino acid sequence. IgA and IgG are further sub-classified as the isotypes IgA1, IgA2, IgG1, IgG2, IgG3 and IgG4. Accordingly, the antibodies of the invention can be of any of the five major classes or corresponding sub-classes. Preferably, the antibodies of the invention are IgG1, IgG2, IgG3 or IgG4. Antibody light chains of vertebrate species can be assigned to one of two clearly distinct types, namely kappa and lambda, based on the amino acid sequences of their constant domains. Accordingly, the antibodies of the invention can contain a kappa or lambda light chain constant domain. According to particular embodiments, the antibodies of the invention include heavy and/or light chain constant regions from rat or human antibodies. In addition to the heavy and light constant domains, antibodies contain an antigen-binding region that is made up of a light chain variable region and a heavy chain variable region, each of which contains three domains (i.e., complementarity determining regions 1-3; CDR1, CDR2, and CDR3). The light chain variable region domains are alternatively referred to as LCDR1, LCDR2, and LCDR3, and the heavy chain variable region domains are alternatively referred to as HCDR1, HCDR2, and HCDR3.

As used herein, the term an "isolated antibody" refers to an antibody which is substantially free of other antibodies having different antigenic specificities (e.g., an isolated antibody that specifically binds to ROR1 is substantially free of antibodies that do not bind to ROR1). In addition, an isolated antibody is substantially free of other cellular material and/or chemicals.

As used herein, the term "monoclonal antibody" refers to an antibody obtained from a population of substantially homogeneous antibodies, i.e., the individual antibodies comprising the population are identical except for possible naturally occurring mutations that may be present in minor amounts. The monoclonal antibodies of the invention can be made by the hybridoma method, phage display technology, single lymphocyte gene cloning technology, or by recombinant DNA methods. For example, the monoclonal antibodies can be produced by a hybridoma which includes a B cell obtained from a transgenic nonhuman animal, such as a transgenic mouse or rat, having a genome comprising a human heavy chain transgene and a light chain transgene.

As used herein, the term "antigen-binding fragment" refers to an antibody fragment such as, for example, a diabody, a Fab, a Fab', a F(ab')2, an Fv fragment, a disulfide stabilized Fv fragment (dsFv), a (dsFv)2, a bispecific dsFv (dsFv-dsFv1), a disulfide stabilized diabody (ds diabody), a single-chain antibody molecule (scFv), a single domain antibody (sdab) an scFv dimer (bivalent diabody), a multi-specific antibody formed from a portion of an antibody comprising one or more CDRs, a camelized single domain antibody, a nanobody, a domain antibody, a bivalent domain antibody, or any other antibody fragment that binds to an antigen but does not comprise a complete antibody structure. An antigen-binding fragment is capable of binding to the same antigen to which the parent antibody or a parent antibody fragment binds. According to particular embodiments, the antigen-binding fragment comprises a light chain variable region, a light chain constant region, and an Fd segment of the heavy chain. According to other particular embodiments, the antigen-binding fragment comprises Fab and F(ab').

As used herein, the term "single-chain antibody" refers to a conventional single chain antibody in the field, which comprises a heavy chain variable region and a light chain variable region connected by a short peptide of about 15 to about 20 amino acids. As used herein, the term "single domain antibody" refers to a conventional single domain antibody in the field, which comprises a heavy chain variable region and a heavy chain constant region or which comprises only a heavy chain variable region.

As used herein, the term "human antibody" refers to an antibody produced by a human or an antibody having an amino acid sequence corresponding to an antibody produced by a human made using any technique known in the art. This definition of a human antibody includes intact or full-length antibodies, fragments thereof, and/or antibodies comprising at least one human heavy and/or light chain polypeptide.

As used herein, the term "humanized antibody" refers to a non-human antibody that is modified to increase the sequence homology to that of a human antibody, such that the antigen-binding properties of the antibody are retained, but its antigenicity in the human body is reduced.

As used herein, the term "chimeric antibody" refers to an antibody wherein the amino acid sequence of the immunoglobulin molecule is derived from two or more species. The variable region of both the light and heavy chains often corresponds to the variable region of an antibody derived from one species of mammal (e.g., mouse, rat, rabbit, etc.) having the desired specificity, affinity, and capability, while the constant regions correspond to the sequences of an antibody derived from another species of mammal (e.g., human) to avoid eliciting an immune response in that species.

As used herein, the term "multispecific antibody" refers to an antibody that comprises a plurality of immunoglobulin variable domain sequences, wherein a first immunoglobulin variable domain sequence of the plurality has binding specificity for a first epitope and a second immunoglobulin variable domain sequence of the plurality has binding specificity for a second epitope. In an embodiment, the first and second epitopes are on the same antigen, e.g., the same protein (or subunit of a multimeric protein). In an embodiment, the first and second epitopes overlap or substantially overlap. In an embodiment, the first and second epitopes do not overlap or do not substantially overlap. In an embodiment, the first and second epitopes are on different antigens, e.g., the different proteins (or different subunits of a multimeric protein). In an embodiment, a multispecific antibody comprises a third, fourth, or fifth immunoglobulin variable domain. In an embodiment, a multispecific antibody is a bispecific antibody molecule, a trispecific antibody molecule, or a tetraspecific antibody molecule.

As used herein, the term "bispecifc antibody" refers to a multispecific antibody that binds no more than two epitopes or two antigens. A bispecific antibody is characterized by a first immunoglobulin variable domain sequence which has binding specificity for a first epitope and a second immunoglobulin variable domain sequence that has binding specificity for a second epitope. In an embodiment, the first and second epitopes are on the same antigen, e.g., the same protein (or subunit of a multimeric protein). In an embodiment, the first and second epitopes overlap or substantially overlap. In an embodiment, the first and second epitopes are on different antigens, e.g., the different proteins (or different subunits of a multimeric protein). In an embodiment, a bispecific antibody comprises a heavy chain variable domain sequence and a light chain variable domain sequence which have binding specificity for a first epitope and a heavy chain variable domain sequence and a light chain variable domain sequence which have binding specificity for a second epitope. In an embodiment, a bispecific antibody comprises a half antibody, or fragment thereof, having binding specificity for a first epitope and a half antibody, or fragment thereof, having binding specificity for a second epitope. In an embodiment, a bispecific antibody comprises a scFv, or fragment thereof, having binding specificity for a first epitope, and a scFv, or fragment thereof, having binding specificity for a second epitope. In an embodiment, the first epitope is located on ROR1 and the second epitope is located on PD-1, PD-L1, LAG-3, TIM-3, CTLA-4, EGFR, HER-2, CD19, CD20, CD33, CD47, CD73, apelin, DLL3, claudin18.2, TIP-I, CD3 and/or other tumor associated immune suppressors or surface antigens.

As used herein, an antibody that "specifically binds to ROR1" refers to an antibody that binds to a ROR1, preferably a human ROR1, with a KD of $1 \times 10^{-7}$ M or less, preferably $1 \times 10^{-8}$ M or less, more preferably $5 \times 10^{-9}$ M or less, $1 \times 10^{-9}$ M or less, $5 \times 10^{-10}$ M or less, or $1 \times 10^{-10}$ M or less. The term "KD" refers to the dissociation constant, which is obtained from the ratio of Kd to Ka (i.e., Kd/Ka) and is expressed as a molar concentration (M). KD values for antibodies can be determined using methods in the art in view of the present disclosure. For example, the KD of an antibody can be determined by using surface plasmon resonance, such as by using a biosensor system, e.g., a Biacore® system, or by using bio-layer interferometry technology, such as an Octet RED96 system.

The smaller the value of the KD of an antibody, the higher affinity that the antibody binds to a target antigen.

By the term "specifically binds" as used herein with respect to an antibody, is meant an antibody which recognizes a specific antigen, but does not substantially recognize or bind other molecules in a sample. For example, an antibody that specifically binds to an antigen from one species may also bind to that antigen from one or more species. But, such cross-species reactivity does not itself alter the classification of an antibody as specific. In another example, an antibody that specifically binds to an antigen may also bind to different allelic forms of the antigen. However, such cross reactivity does not itself alter the classification of an antibody as specific. In some instances, the terms "specific binding" or "specifically binding", can be used in reference to the interaction of an antibody, a protein, or a peptide with a second chemical species, to mean that the interaction is dependent upon the presence of a particular structure (e.g., an antigenic determinant or epitope) on the chemical species; for example, an antibody recognizes and binds to a specific protein structure rather than to proteins generally. If an antibody is specific for epitope "A", the presence of a molecule containing epitope A (or free, unlabeled A), in a reaction containing labeled "A" and the antibody, will reduce the amount of labeled A bound to the antibody.

In certain embodiments, antibodies and antigen-binding fragments thereof as described herein include a heavy chain and a light chain CDR set, respectively interposed between a heavy chain and a light chain framework region (FR) set which provide support to the CDRs and define the spatial relationship of the CDRs relative to each other. As used herein, the term "CDR set" refers to the three hypervariable regions of a heavy or light chain V region. Proceeding from the N-terminus of a heavy or light chain, these regions are denoted as "CDR1", "CDR2", and "CDR3" respectively. An antigen-binding site, therefore, includes six CDRs, comprising the CDR set from each of a heavy and a light chain V region. A polypeptide comprising a single CDR, (e.g., a CDR1, CDR2 or CDR3) is referred to herein as a "molecular recognition unit." Crystallographic analysis of a number of antigen-antibody complexes has demonstrated that the amino acid residues of CDRs form extensive contact with bound antigen, wherein the most extensive antigen contact is with the heavy chain CDR3. Thus, the molecular recognition units are primarily responsible for the specificity of an antigen-binding site.

As used herein, the term "FR set" refers to the four flanking amino acid sequences which frame the CDRs of a CDR set of a heavy or light chain V region. Some FR residues may contact bound antigen; however, FRs are primarily responsible for folding the V region into the antigen-binding site, particularly the FR residues directly adjacent to the CDRs. Within FRs, certain amino residues and certain structural features are very highly conserved. In this regard, all V region sequences contain an internal disulfide loop of around 90 amino acid residues. When the V regions fold into a binding-site, the CDRs are displayed as projecting loop motifs which form an antigen-binding surface. It is generally recognized that there are conserved structural regions of FRs which influence the folded shape of the CDR loops into certain "canonical" structures—regardless of the precise CDR amino acid sequence. Further, certain FR residues are known to participate in non-covalent interdomain contacts which stabilize the interaction of the antibody heavy and light chains.

The structures and locations of immunoglobulin variable regions may be determined by reference to Kabat, E. A. et al, Sequences of Proteins of Immunological Interest, 4th Edition, US Department of Health and Human Services, 1987, and updates thereof, now available on the Internet (immuno.bme.nwu.edu).

An "antibody heavy chain" as used herein refers to the larger of the two types of polypeptide chains present in all antibody molecules in their naturally occurring conformations. The heavy chain from any vertebrate species can be assigned to one of five different classes (or isotypes): IgA, IgD, IgE, IgG, and IgM. These classes are also designated α, δ, ε, γ, and μ, respectively. The IgG and IgA classes are further divided into subclasses on the basis of differences in sequence and function. Humans express the following subclasses: IgG1, IgG2, IgG3, IgG4, IgA1, and IgA2.

An "antibody light chain" as used herein refers to the smaller of the two types of polypeptide chains present in all antibody molecules in their naturally occurring conformations. κ and λ light chains refer to the two major antibody light chain isotypes.

By the term "synthetic antibody" as used herein is meant an antibody which is generated using recombinant DNA technology, such as, for example, an antibody expressed by a bacteriophage as described herein. The term should also be construed to mean an antibody which has been generated by the synthesis of a DNA molecule encoding the antibody and which DNA molecule expresses an antibody protein, or an amino acid sequence specifying the antibody, wherein the DNA or amino acid sequence has been obtained using synthetic DNA or amino acid sequence technology which is available and well known in the art.

In preferred embodiments, the isolated monoclonal antibody or antigen-binding fragment thereof comprises a heavy chain complementarity determining region 1 (HCDR1), a HCDR2, a HCDR3, a light chain complementarity determining region 1 (LCDR1), a LCDR2, and a LCDR3. The polypeptide sequences of HCDR1, HCDR2, HCDR3, LCDR1, LCDR2, and LCDR3 have selected from the group consisting of:
  a. SEQ ID NOs: 2, 3, 4, 6, 7 and 8; or
  b. SEQ ID NOs: 16, 17, 18, 20, 21 and 22; or
  c. SEQ ID NOs: 30, 31, 32, 34, 35 and 36;
  wherein the antibody or antigen-binding fragment thereof specifically binds ROR1, preferably human ROR1.

In preferred embodiments, the isolated monoclonal antibody or antigen-binding fragment thereof comprises a heavy chain complementarity determining region 1 (HCDR1), a HCDR2, a HCDR3, a light chain complementarity determining region 1 (LCDR1), a LCDR2, and a LCDR3. The polypeptide sequences of HCDR1, HCDR2, HCDR3, LCDR1, LCDR2, and LCDR3 have selected from the group consisting of:
  a. SEQ ID NOs: 9, 10, 11, 12, position 1-2 of SEQ ID No:13 (DA), and SEQ ID No: 14; or
  b. SEQ ID NOs: 23, 24, 25, 26, position 1-2 of SEQ ID No:27 (DA), and SEQ ID No: 28, or
  c. SEQ ID NOs: 37, 38, 39, 40, position 1-2 of SEQ ID No: 41 (DA), and SEQ ID No: 42;
  wherein the antibody or antigen-binding fragment thereof specifically binds ROR1, preferably human ROR1.

According to another particular aspect, the invention relates to an isolated monoclonal antibody or antigen-binding fragment thereof comprising a heavy chain variable region having a polypeptide sequence at least 85%, preferably 90%, more preferably 95/or more, such as 95%, 96%, 97%, 98%, or 99% identical to one of SEQ ID NO: 1, 15, or 29, or a light chain variable region having a polypeptide sequence at least 85%, preferably 90%, more preferably 95;% or more, such as 95%, 96%, 97%, 98%, or 99% identical to one of SEQ ID NO: 5, 19, or 33.

In the present invention, the antibody of the present invention also includes a conservative variant thereof, which means that, compared to the amino acid sequence of the antibody of the present invention, there are up to 10, preferably up to 8 and more preferably up to 5, most preferably up to 3 amino acids are replaced by amino acids with similar or similar properties to form a polypeptide. These conservative variant polypeptides are preferably produced by amino acid substitution according to Table A.

TABLE A

| Original residue | Representative replacement | Preferred replacement s |
|---|---|---|
| Ala (A) | Val; Leu; Ile | Val |
| Arg (R) | Lys; Gln; Asn | Lys |
| Asn (N) | Gln; His; Lys; Arg | Gln |
| Asp (D) | Glu | Glu |
| Cys (C) | Ser | Ser |
| Gln (Q) | Asn | Asn |
| Glu (E) | Asp | Asp |
| Gly (G) | Pro; Ala | Ala |
| His (H) | Asn; Gln; Lys; Arg | Arg |

TABLE A-continued

| Original residue | Representative replacement | Preferred replacement s |
| --- | --- | --- |
| Ile (I) | Leu; Val; Met; Ala; Phe | Leu |
| Leu (L) | Ile; Val; Met; Ala; Phe | Ile |
| Lys (K) | Arg; Gln; Asn | Arg |
| Met (M) | Leu; Phe; Ile | Leu |
| Phe (F) | Leu; Val, Ile; Ala; Tyr | Leu |
| Pro (P) | Ala | Ala |
| Ser (S) | Thr | Thr |
| Thr (T) | Ser | Ser |
| Trp (W) | Tyr; Phe | Tyr |
| Tyr (Y) | Trp; Phe; Thr; Ser | Phe |
| Val (V) | Ile; Leu; Met; Phe; Ala | Leu | the invention relates to an isolated nucleic acid encoding a monoclonal antibody or antigen-binding fragment thereof of the invention. It will be appreciated by those skilled in the art that the coding sequence of a protein can be changed (e.g., replaced, deleted, inserted, etc.) without changing the amino acid sequence of the protein. Accordingly, it will be understood by those skilled in the art that nucleic acid sequences encoding monoclonal antibody or antigen-binding fragment thereof of the invention can be altered without changing the amino acid sequences of the proteins.

Polynucleotides, Vectors, Host Cell and Method of Preparation

The invention also provides polynucleotides encoding the antibody of invention.

the invention also provides to a vector comprising an isolated nucleic acid encoding a monoclonal antibody or antigen-binding fragment thereof of the invention. Any vector known to those skilled in the art in view of the present disclosure can be used, such as a plasmid, a cosmid, a phage vector or a viral vector. In some embodiments, the vector is a recombinant expression vector such as a plasmid. The vector can include any element to establish a conventional function of an expression vector, for example, a promoter, ribosome binding element, terminator, enhancer, selection marker, and origin of replication. The promoter can be a constitutive, inducible or repressible promoter. A number of expression vectors capable of delivering nucleic acids to a cell are known in the art and can be used herein for production of an antibody or antigen-binding fragment thereof in the cell. Conventional cloning techniques or artificial gene synthesis can be used to generate a recombinant expression vector according to embodiments of the invention. Such techniques are well known to those skilled in the art in view of the present disclosure.

The invention also provides a host cell comprising an isolated nucleic acid encoding a monoclonal antibody or antigen-binding fragment thereof of the invention. Any host cell known to those skilled in the art in view of the present disclosure can be used for recombinant expression of antibodies or antigen binding fragments thereof of the invention. In some embodiments, the host cells are E. coli TG1 or BL21 cells (for expression of, e.g., an scFv or Fab antibody), CHO-DG44 or CHO-K1 cells or HEK293 cells (for expression of, e.g., a full-length IgG antibody). According to particular embodiments, the recombinant expression vector is transformed into host cells by conventional methods such as chemical transfection, heat shock, or electroporation, where it is stably integrated into the host cell genome such that the recombinant nucleic acid is effectively expressed.

The invention also provides to a method of producing a monoclonal antibody or antigen-binding fragment thereof of the invention, comprising culturing a cell comprising a nucleic acid encoding the monoclonal antibody or antigen binding fragment thereof under conditions to produce a monoclonal antibody or antigen binding fragment thereof of the invention, and recovering the antibody or antigen-binding fragment thereof from the cell or cell culture (e.g., from the supernatant). Expressed antibodies or antigen-binding fragments thereof can be harvested from the cells and purified according to conventional techniques known in the art and as described herein.

As will be understood by those skilled in the art, polynucleotides may include genomic sequences, extra-genomic and plasmid-encoded sequences and smaller engineered gene segments that express, or may be adapted to express, proteins, polypeptides, peptides and the like. Such segments may be naturally isolated, or modified synthetically by the skilled person.

As will also be recognized by the skilled artisan, polynucleotides may be single-stranded (coding or antisense) or double-stranded, and may be DNA (genomic, cDNA or synthetic) or RNA molecules. RNA molecules may include HnRNA molecules, which contain introns and correspond to a DNA molecule in a one-to-one manner, and mRNA molecules, which do not contain introns. Additional coding or non-coding sequences may, but need not, be present within a polynucleotide according to the present disclosure, and a polynucleotide may, but need not, be linked to other molecules and/or support materials. Polynucleotides may comprise a native sequence or may comprise a sequence that encodes a variant or derivative of such a sequence.

Typically, polynucleotide variants will contain one or more substitutions, additions, deletions and/or insertions, preferably such that the binding affinity of the antibody encoded by the variant polynucleotide is not substantially diminished relative to an antibody encoded by a polynucleotide sequence specifically set forth herein.

The polynucleotides described herein, or fragments thereof, regardless of the length of the coding sequence itself, may be combined with other DNA sequences, such as promoters, polyadenylation signals, additional restriction enzyme sites, multiple cloning sites, other coding segments, and the like, such that their overall length may vary considerably. It is therefore contemplated that a nucleic acid fragment of almost any length may be employed, with the total length preferably being limited by the ease of preparation and use in the intended recombinant DNA protocol. For example, illustrative polynucleotide segments with total lengths of about 10000, about 5000, about 3000, about 2000, about 1000, about 500, about 200, about 100, about 50 base pairs in length, and the like, (including all intermediate lengths) are contemplated to be useful.

Site-specific mutagenesis allows the production of mutants through the use of specific oligonucleotide sequences which encode the DNA sequence of the desired mutation, as well as a sufficient number of adjacent nucleotides, to provide a primer sequence of sufficient size and sequence complexity to form a stable duplex on both sides of the deletion junction being traversed. Mutations may be employed in a selected polynucleotide sequence to improve, alter, decrease, modify, or otherwise change the properties of the polynucleotide itself, and/or alter the properties, activity, composition, stability, or primary sequence of the encoded polypeptide.

Antibody-Drug Conjugate (ADC)

The present invention also provides an antibody-drug conjugate (ADC) based on the antibody according to the present invention.

Typically, the antibody-drug conjugate comprises the antibody and an effector molecule, wherein the antibody is conjugated to the effector molecule, and chemical conjugation is preferred. Preferably, the effector molecule is a therapeutically active drug. In addition, the effector molecule may be one or more of a toxic protein, a chemotherapeutic drug, a small-molecule drug or a radionuclide.

The antibody according to present invention and the effector molecule may be coupled by a coupling agent. Examples of the coupling agent may be any one or more of a non-selective coupling agent, a coupling agent utilizing a carboxyl group, a peptide chain, and a coupling agent utilizing a disulfide bond. The non-selective coupling agent refers to a compound that results in a linkage between an effector molecule and an antibody via a covalent bond, such as glutaraldehyde, etc. The coupling agent utilizing a carboxyl group may be any one or more of cis-aconitic anhydride coupling agents (such as cis-aconitic anhydride) and acyl hydrazone coupling agents (the coupling site is acyl hydrazone).

Certain residues on an antibody (such as Cys or Lys, etc.) are used to link a variety of functional groups, including imaging agents (such as chromophores and fluorophores), diagnostic agents (such as MRI contrast agents and radio-isotopes), stabilizers (such as poly(ethylene glycol)) and therapeutic agents. An antibody can be conjugated to a functional agent to form a conjugate of the antibody-functional agent. A functional agent (e.g. a drug, a detection reagent, a stabilizer) is conjugated (covalently linked) to an antibody. A functional agent can be linked to an antibody either directly or indirectly via a linker.

Antibodies can be conjugated to drugs to form antibody-drug conjugates (ADCs). Typically, an ADC comprises a linker between a drug and an antibody. The linker can be a degradable or non-degradable linker. Typically, degradable linkers are easily degraded in an intracellular environment, for example, the linker is degraded at the target site, thereby releasing the drug from the antibody. Suitable degradable linkers include, for example, enzyme-degradable linkers, including peptidyl-containing linkers that can be degraded by protease (e.g. lysosomal protease or endosomal protease) in a cell, or sugar linkers, for example, glucuronide-containing linkers that can be degraded by glucuronidase. Peptidyl linkers may include, for example, dipeptides, such as valine-citrulline, phenylalanine-lysine or valine-alanine. Other suitable degradable linkers include, for example, pH sensitive linkers (e.g. linkers that are hydrolyzed at a pH of below 5.5, such as hydrazone linkers) and linkers that are degraded under reducing conditions (e.g. disulfide-bond linkers). A non-degradable linker typically releases a drug under conditions that the antibody is hydrolyzed by protease.

Prior to linkage to an antibody, a linker has a reactive group capable of reacting with certain amino acid residues, and the linkage is achieved by the reactive group. A thiol-specific reactive group is preferred, which includes, for example, a maleimide compound, a halogenated (e.g. iodo-, bromo- or chloro-substituted) amide; a halogenated (e.g. iodo-, bromo- or chloro-substituted) ester; a halogenated (e.g. iodo-, bromo- or chloro-substituted) methyl ketone, a benzyl halide (e.g. iodide, bromide or chloride); vinyl sulfone, pyridyl disulfide; a mercury derivative such as 3,6-di-(mercurymethyl)dioxane, wherein the counter ion is $CH_3COO^-$, $Cl^-$ or $NO3^-$; and polymethylene dimethyl sulfide thiosulfonate. The linker may include, for example, a maleimide linked to an antibody via thiosuccimide.

A drug may be any cytotoxic, cytostatic or immunosuppressive drug. In an embodiment, an antibody is linked to a drug via a linker, and the drug has a functional group that can form a bond with the linker. For example, a drug may have an amino group, a carboxyl group, a thiol group, a hydroxyl group, or a ketone group that can form a bond with a linker. When a drug is directly linked to a linker, the drug has a reactive group before being linked to an antibody.

Useful drugs include, for example, anti-tubulin drugs, DNA minor groove binding agents, DNA replication inhibitors, alkylating agents, antibiotics, folic acid antagonists, antimetabolites, chemotherapy sensitizers, topoisomerase inhibitors, vinca alkaloids, etc. Examples of particularly useful cytotoxic drugs include, for example, DNA minor groove binding agents, DNA alkylating agents, and tubulin inhibitors, typical cytotoxic drugs include, for example, auristatins, camptothecins, docamycin/duocarmycins, etoposides, maytansines and maytansinoids (e.g. DM1 and DM4), taxanes, benzodiazepines or benzodiazepine containing drugs (e.g. pyrrolo[1,4]benzodiazepines (PBDs), indolinobenzodiazepines and oxazolidinobenzodiazepines), and vinca alkaloids.

In the present invention, a drug-linker can be used to form an ADC in a simple step process. In other embodiments, a bifunctional linker compound can be used to form an ADC in a two-step or multi-step process. For example, a cysteine residue is reacted with the reactive moiety of a linker in a first step, and then the functional group on the linker is reacted with a drug in the subsequent step, so as to form an ADC.

In general, the functional group on a linker is selected so that it can specifically react with the suitable reactive group on a drug moiety. As a non-limiting example, an azide-based moiety can be used to specifically react with the reactive alkynyl group on a drug moiety. The drug is covalently bound to the linker by 1,3-dipolar cycloaddition between the azide and alkynyl group. Other useful functional groups include, for example, ketones and aldehydes (suitable for reacting with hydrazides and alkoxyamines), phosphines (suitable for reacting with azides); isocyanates and isothiocyanates (suitable for reacting with amines and alcohols); and activated esters, for example, N-hydroxysuccinimide esters (suitable for reacting with amines and alcohols). These and other linkage strategies, for example, those described in Bioconjugation Technology (2nd Edition (Elsevier)), are well known to those skilled in the art. Those skilled in the art could understand that when a complementary pair of reactive functional groups are selected for a selective reaction between a drug moiety and a linker, each member of the complementary pair can be used for the linker, and can also be used for the drug.

The present invention further provides a method for preparing an ADC, which may further comprise: under conditions sufficient to form an antibody-drug conjugate (ADC), binding an antibody to a drug-linker compound.

In certain embodiments, the method according to the present invention comprises: under conditions sufficient to form an antibody-linker conjugate, binding an antibody to a bifunctional linker compound. In these embodiments, the method according to the present invention further comprises: under conditions sufficient to covalently link the drug moiety to the antibody via a linker, binding the antibody-linker conjugate to the drug moiety.

In some embodiments, an antibody-drug conjugate (ADC) has a formula as follows:

$$Ab\text{-}(LU\text{-}D)p$$

wherein:
Ab is an antibody,
LU is a linker;
D is a drug;
and the subscript p is an value selected from 1 to 8.

Pharmaceutical Compositions and Other Uses

The antibodies of the invention can bind to receptor tyrosine kinase-like orphan receptor 1 (ROR1), a membrane-receptor with an intracellular kinase-like domain and extracellular Frizzled-like cysteine-rich domain, which is common to receptors of members of the Wnt family. In particular, the antibodies described herein specifically bind to ROR1 with unexpectedly high affinity and will in certain embodiments have therapeutic utility for the treatment of diseases associated with ROR1 expression, such as diseases associated with aberrant or altered ROR1 expression, and in particular ROR1 overexpression (e.g., detectable ROR1 expression at a level that is greater in magnitude than the level of expression that is detectable in and/or on a normal or disease-free cell). Such diseases include various forms of cancer and include, without limitation, breast cancer, prostate cancer, liver cancer, lung cancer, pancreatic cancer, colon cancer, kidney cancer, chronic lymphocyte leukemia (CLL), acute lymphocytic leukemia (ALL), and other cancers. Amino acid sequences of illustrative antibodies, or antigen-binding fragments thereof, or complementarity determining regions (CDRs) thereof.

The invention also provides a pharmaceutical composition, comprising an isolated monoclonal antibody or antigen-binding fragment thereof of the invention and a pharmaceutically acceptable carrier. The term "pharmaceutical composition" as used herein means a product comprising an active ingredient of the invention together with a pharmaceutically acceptable carrier, wherein the active ingredient is selected from the group consisting of: the isolated monoclonal antibody or antigen-binding fragment thereof in the first aspect, the recombinant protein in the second aspect, the isolated nucleic acids (especially DNA or RNA) in the third aspect, the vector in the fourth aspect, the antibody conjugate in the sixth aspect, the immune cell in the seventh aspect, or combinations thereof. The active ingredient of the invention and compositions comprising them are also useful in the manufacture of a medicament for therapeutic applications mentioned herein.

The term "anti-tumor effect" as used herein refers to a biological effect which can be manifested by a decrease in tumor volume, a decrease in the number of tumor cells, a decrease in the number of metastases, an increase in life expectancy, or amelioration of various physiological symptoms associated with the cancerous condition. An "anti-tumor effect" can also be manifested by the ability of the peptides, polynucleotides, cells and antibodies of the invention in prevention of the occurrence of tumor in the first place.

To "treat" a disease as the term is used herein refers to reduce the frequency or severity of at least one sign or symptom of a disease or disorder experienced by a subject.

In some embodiments, the antibodies are formulated into pharmaceutical compositions suitable for administration to a mammal, e.g., a human patient. The compositions typically comprise one or more antibodies of the present invention and a pharmaceutically acceptable excipient. The term "pharmaceutically acceptable excipient" includes suitable solvents, dispersion media, coatings, antibacterial agents and antifungal agents, isotonic agents, and absorption delaying agents, and the like, that are compatible with pharmaceutical administration. The use of such media and agents for pharmaceutically active substances is known in the art. The compositions also can contain other active compounds providing supplemental, additional, or enhanced therapeutic functions. The pharmaceutical compositions also can be included in a container, pack, or dispenser together with instructions for administration.

A pharmaceutical composition of the invention is formulated to be compatible with its intended route of administration. Methods to accomplish the administration are known in the art. The administration may be, for example, intravenous, intraperitoneal, intramuscular, intracavity, subcutaneous, intradermal, topical, inhalation, transmucosal, rectal or transdermal.

Solutions or suspensions used for intradermal or subcutaneous application typically include one or more of the following components: a sterile diluent such as water for injection, saline solution, fixed oils, polyethylene glycols, glycerin, propylene glycol, or other synthetic solvents; antibacterial agents such as benzyl alcohol or methyl parabens; antioxidants such as ascorbic acid or sodium bisulfate; chelating agents such as EDTA; buffers such as acetates, citrates or phosphates; and agents for the adjustment of tonicity such as sodium chloride or dextrose. The pH can be adjusted with acids or bases, as necessary. Such preparations may be enclosed in ampoules, disposable syringes or multiple dose vials made of glass or plastic.

Pharmaceutical compositions suitable for injection include sterile aqueous solutions or dispersions and sterile powders for the extemporaneous preparation of sterile injectable solutions or dispersion. Sterilization can be accomplished, for example, by filtration through sterile filtration membranes. For intravenous administration, suitable carriers include, for example, physiological saline, bacteriostatic water, Cremophor EL (BASF, Parsippany, N.J.) or phosphate buffered saline (PBS). Preferably, the pharmaceutical composition is stable under the conditions of manufacture and storage and is preserved against contamination by microorganisms such as bacteria and fungi. Avoidance of microorganisms can be achieved by inclusion of antibacterial and/or antifungal agents. Examples include: parabens, chlorobutanol, phenol, ascorbic acid, thimerosal, and the like. In many cases, it will be preferable to include isotonic agents, for example, sugars, polyalcohols such as mannitol, sorbitol, and sodium chloride in the composition. The carrier can be a solvent or dispersion medium containing, for example, water, ethanol, polyol such as glycerol, propylene glycol, liquid polyetheylene glycol, and the like, and suitable mixtures thereof. The proper fluidity can be maintained, for example, by the use of a coating such as lecithin, by the maintenance of the required particle size in the case of dispersion and/or by the use of surfactants. Prolonged absorption of the injectable compositions can be achieved by including in the composition an agent that delays absorption, e.g., aluminum monostearate or gelatin.

Oral compositions generally include an inert diluent or an edible carrier. They can be enclosed in gelatin capsules or compressed into tablets. For oral administration, the antibodies can be combined with excipients and used in the form of tablets, troches, or capsules.

Preferably, the composition of the invention is liquid preparation, such as aqueous formulation, or an injection.

The pH in an aqueous formulation can be between pH 3 and pH 10. In one embodiment of the invention, the pH of the formulation is from about 7.0 to about 9.5. In another embodiment of the invention, the pH of the formulation is from about 3.0 to about 7.0. In another embodiment of the invention, the pharmaceutical composition comprises a buffer. Non-limiting examples of buffers include: arginine, aspartic acid, bicine, citrate, disodium hydrogen phosphate, fumaric acid, glycine, glycylglycine, histidine, lysine, maleic acid, malic acid, sodium acetate, sodium carbonate, sodium dihydrogen phosphate, sodium phosphate, succinate, tartaric acid, tricine, and tris(hydroxymethyl)-aminomethane, and mixtures thereof. The buffer can be present individually or in the aggregate, in a concentration from about 0.01 mg/mL to about 50 mg/mL, for example from about 0.1 mg/mL to about 20 mg/mL. Pharmaceutical compositions comprising each one of these specific buffers constitute alternative embodiments of the invention.

In another embodiment of the invention, the pharmaceutical composition comprises a preservative. Non-limiting examples of preservatives include: benzethonium chloride, benzoic acid, benzyl alcohol, bronopol, butyl 4-hydroxybenzoate, chlorobutanol, chlorocresol, chlorohexidine, chlorphenesin, o-cresol, m-cresol, p-cresol, ethyl 4-hydroxybenzoate, imidurea, methyl 4-hydroxybenzoate, phenol, 2-phenoxyethanol, 2-phenyl ethanol, propyl 4-hydroxybenzoate, sodium dehydroacetate, thiomerosal, and mixtures thereof. The preservative can be present individually or in the aggregate, in a concentration from about 0.01 mg/mL to about 50 mg/mL, for example from about 0.1 mg/mL to about 20 mg/mL. Pharmaceutical compositions comprising each one of these specific preservatives constitute alternative embodiments of the invention.

In another embodiment of the invention, the pharmaceutical composition comprises an isotonic agent. Non-limiting examples of the embodiment include a salt (such as sodium chloride), an amino acid (such as glycine, histidine, arginine, lysine, isoleucine, aspartic acid, tryptophan, and threonine), an alditol (such as glycerol, 1,2-propanediol propyleneglycol), 1,3-propanediol, and 1,3-butanediol), poly ethyleneglycol (e.g. PEG400), and mixtures thereof. Another example of an isotonic agent includes a sugar. Non-limiting examples of sugars may be mono-, di-, or polysaccharides, or water-soluble glucans, including for example fructose, glucose, mannose, sorbose, xylose, maltose, lactose, sucrose, trehalose, dextran, pullulan, dextrin, cyclodextrin, alpha and beta-HPCD, soluble starch, hydroxyethyl starch, and sodium carboxymethylcellulose. Another example of an isotonic agent is a sugar alcohol, wherein the term "sugar alcohol" is defined as a C(4-8) hydrocarbon having at least one —OH group. Non-limiting examples of sugar alcohols include mannitol, sorbitol, inositol, galactitol, dulcitol, xylitol, and arabitol. The isotonic agent can be present individually or in the aggregate, in a concentration from about 0.01 mg/mL to about 50 mg/mL, for example from about 0.1 mg/mL to about 20 mg/mL. Pharmaceutical compositions comprising each one of these specific isotonic agents constitute alternative embodiments of the invention.

In another embodiment of the invention, the pharmaceutical composition comprises a chelating agent. Non-limiting examples of chelating agents include citric acid, aspartic acid, salts of ethylenediaminetetraacetic acid (EDTA), and mixtures thereof. The chelating agent can be present individually or in the aggregate, in a concentration from about 0.01 mg/mL to about 50 mg/mL, for example from about 0.1 mg/mL to about 20 mg/mL. Pharmaceutical compositions comprising each one of these specific chelating agents constitute alternative embodiments of the invention.

In another embodiment of the invention, the pharmaceutical composition comprises a stabilizer. Non-limiting examples of stabilizers include one or more aggregation inhibitors, one or more oxidation inhibitors, one or more surfactants, and/or one or more protease inhibitors.

In another embodiment of the invention, the pharmaceutical composition comprises a stabilizer, wherein said stabilizer is carboxy-/hydroxycellulose and derivates thereof (such as HPC, HPC-SL, HPC-L and HPMC), cyclodextrins, 2-methylthioethanol, polyethylene glycol (such as PEG 3350), polyvinyl alcohol (PVA), polyvinyl pyrrolidone, salts (such as sodium chloride), sulphur-containing substances such as monothioglycerol), or thioglycolic acid. The stabilizer can be present individually or in the aggregate, in a concentration from about 0.01 mg/mL to about 50 mg/mL, for example from about 0.1 mg/mL to about 20 mg/mL. Pharmaceutical compositions comprising each one of these specific stabilizers constitute alternative embodiments of the invention.

In further embodiments of the invention, the pharmaceutical composition comprises one or more surfactants, preferably a surfactant, at least one surfactant, or two different surfactants. The term "surfactant" refers to any molecules or ions that are comprised of a water-soluble (hydrophilic) part, and a fat-soluble (lipophilic) part. The surfactant can, for example, be selected from the group consisting of anionic surfactants, cationic surfactants, nonionic surfactants, and/or zwitterionic surfactants. The surfactant can be present individually or in the aggregate, in a concentration from about 0.1 mg/mL to about 20 mg/mL. Pharmaceutical compositions comprising each one of these specific surfactants constitute alternative embodiments of the invention.

In a further embodiment of the invention, the pharmaceutical composition comprises one or more protease inhibitors, such as, e.g., EDTA, and/or benzamidine hydrochloric acid (HCl). The protease inhibitor can be present individually or in the aggregate, in a concentration from about 0.1 mg/mL to about 20 mg/mL. Pharmaceutical compositions comprising each one of these specific protease inhibitors constitute alternative embodiments of the invention.

In certain embodiments and according to non-limiting theory, the herein described anti-ROR1 antibodies may be contacted with cancer stem cells (CSCs) alone or in combination with other agents, to inhibit tumor propagation.

In some embodiments, pharmaceutical compositions contain, in addition to an antibody of the invention, a cytotoxic agent, cytostatic agent, anti-angiogenic agent, a tumor targeted agent, an immune stimulating agent or immune modulating agent, or an antibody conjugated to a cytotoxic, cytostatic, or otherwise toxic agent. The pharmaceutical composition optionally can be employed with other therapeutic modalities such as surgery, chemotherapy, and radiation.

Toxicity and therapeutic efficacy of the composition of the invention can be determined by conventional pharmaceutical procedures in cell cultures or experimental animals, e.g., for determining the $LD_{50}$ (the dose lethal to 50% of the population) and the $ED_{50}$ (the dose therapeutically effective in 50% of the population). The dose ratio between toxic and therapeutic effects is the therapeutic index and it can be expressed as the ratio $LD_{50}/ED_{50}$. Compositions that exhibit large therapeutic indices are preferred.

The amount administered will depend on variables such as the type and extent of disease or indication to be treated, the overall health of the patient, the in vivo potency of the antibody, the pharmaceutical formulation, the serum half-life of the antibody, and the route of administration.

Administration frequency can vary, depending on factors such as route of administration, dosage amount, serum half-life of the antibody or fusion protein, and the disease being treated.

The said pharmaceutical compositions can be used to treat a mammal, e.g., a human patient, with a pre-malignant or malignant cancer condition characterized by ROR1-expressing cells, especially by an overabundance of ROR1-expressing cells. Such conditions are found in hematological malignancy, such as leukemia.

Leukemia can be acute myelogenous leukemia, chronic myelogenous leukemia, melodysplastic syndrome, acute lymphoid leukemia, chronic lymphoid leukemia, and myelodysplastic syndrome.

According to one preferred embodiment, said anti-ROR1 antibodies are provided for the treatment of the Chronic Lymphocytic Leukemia (CLL) or the Acute Lymphocytic Leukemia (ALL).

Types of cancers to be treated with the antibodies of the invention include, but are not limited to non-solid tumors (such as hematological malignancy). Adult tumors/cancers and pediatric tumors/cancers are also included.

Also, solid tumors such as breast, colon, liver, lung, kidney, pancreas, prostate tumors, renal, and ovarian can be treated by the antibodies of the invention.

In some embodiments, antibodies of the invention are used for non-therapeutic purposes, such as diagnostic tests and assays. For example, the antibodies are useful for differentiation between ROR1 expressing cancer cells ("ROR1 cancer") and normal cells. For example, an immunoassay that detects ROR1 in a sample from a subject by contacting the sample with a ROR-specific antibody of the invention and detecting immunoreactivity between the antibody and ROR1 in the sample is provided.

Detection Application and Kit

The antibody or an ADC thereof according to the present invention can be used in detection application, for example, for use in detection of a sample so as to provide diagnostic information.

In the present invention, the specimen (sample) used includes a cell, a tissue sample and a biopsy specimen. The term "biopsy" used in the present invention should include all kinds of biopsies known by those skilled in the art. Therefore, the biopsy specimen used in the present invention may include, for example, a resected sample of a tumor, and a tissue sample prepared by endoscopic methods or puncture or needle puncture biopsy of an organ.

The sample used in the present invention includes a fixed or preserved cell or tissue sample.

The present invention further provides a kit only comprising the antibody (or a fragment thereof) according to the present invention; in a preferred example of the present invention, the kit further comprises containers, instructions, buffers, etc. In the preferred examples, the antibody according to the present invention can be immobilized on a test panel.

In accordance with a further aspect of the invention, a ROR cancer is diagnosed in a subject by detecting the presence or quantity of ROR1 protein in a sample.

The present invention provides a kit for predicting or diagnosing the prognosis of ROR1 cancers, the kit comprising the anti-ROR1 antibody. The kit of the present invention may further comprise tools and/or reagents known in the art which are used for ELISA. The kit of the present invention may further comprise, if necessary, tubes which are to be used to mix respective components, well plates, instruction manuals describing how to use, or the like.

The main advantages of the present invention include:

(a) the antibody according to the present invention has an excellent bioactivity and specificity, it has a good binding affinity for cell surface ROR1, and may be used as an ROR1-targeting antibody;

(b) the fully human antibody according to the present invention not only has an activity comparable to that of immune antibodies, but also has a lower immunogenicity;

(c) both the antibody and the ADC according to the present invention have a significant anti-tumor activity, and have no obvious toxic side-effects on mammals themselves; and (d) the antibody and the ADC according to the present invention not only have significant therapeutic effects in tumor models, but also are applicable to other high ROR1 expression-associated diseases.

The present invention is further described by reference to the following particular examples. It should be understood that the following examples are only used to describe the present invention, rather than limiting the scope of the present invention. The experimental methods in the following examples, the specific conditions of which are not indicated, are usually carried out according to conventional conditions, for example, the conditions described in Sambrook et al., Molecular Cloning: Laboratory Manual (New York: Cold Spring Harbor Laboratory Press, 1989), or the conditions recommended by the manufacturers. Unless otherwise specified, percentages and parts refer to percentages by weight and parts by weight. Cell lines are the conventional products that are commercially available or are purchased from ATCC, and all the plasmids are the products that are commercially available.

Cell Lines:

The CHO-K1 cell line was obtained from ATCC (ATCC® CCL-61™) and was cultured in F-12K Medium supplemented with 10% FBS.

Example 1. Generation of Anti-ROR1-Specific Antibodies Using Phage Display System Synthetic of anti-ROR1 antibodies using phage display antibodies that were generated through the use of a proprietary enhanced human naïve phage library (ProMab Biotechnologies, Inc.). These anti-ROR1 antibodies bind epitopes that span the entire length of the extra-cellular domain of the ROR1 protein (FIG. 1). The anti-ROR1 antibodies of clones C3, G3 and G6 were three high affinity antibodies whose amino acid sequences of $V_H$ and $V_L$ were shown in Table 1, FIGS. 6-11.

TABLE 1

The amino acid sequence of the anti-ROR1 antibodies of clones C3, G3 and G6.

| Name or region | Sequence | SEQ ID No./Position |
|---|---|---|
| | C3 | |
| C3-V$_H$ | QVQLQESGPGLVKPSETLSLTCTVSGGSISSYYWSWIRQLPGKG LEWIGYMHYSGSTSYNPSLKGRLTISVDTSTNQFSLKLGSVTAA DTAVYYCARYYYHDSSGYYSYFDYWGQGTLVTVSS | SEQ ID No: 1 |
| Kobat | CDR1: SYYWS | SEQ ID No: 2 |
| | CDR2: YMHYSGSTSYNPSLKG | SEQ ID No: 3 |
| | CDR3: YYYHDSSGYYSYFDY | SEQ ID No: 4 |
| | FR1: QVQLQESGPGLVKPSETLSLTCTVSGGSIS | Position 1-30 of SEQ ID No: 1 |
| | FR2: WIRQLPGKGLEWIG | Position 36-49 of SEQ ID No: 1 |
| | FR3: RLTISVDTSTNQFSLKLGSVTAADTAVYYCAR | Position 66-97 of SEQ ID No: 1 |
| | FR4: WGQGTLVTVSS | Position 112-123 of SEQ ID No: 1 |
| IMGT | CDR1: GGSISSYY | SEQ ID No: 9 |
| | CDR2: MHYSGST | SEQ ID No: 10 |
| | CDR3: ARYYYHDSSGYYSYFDY | SEQ ID No: 11 |
| | FR1: QVQLQESGPGLVKPSETLSLTCTVS | Position 1-25 of SEQ ID No: 1 |
| | FR2: WSWIRQLPGKGLEWIGY | Position 34-50 of SEQ ID No: 1 |
| | FR3: SYNPSLKGRLTISVDTSTNQFSLKLGSVTAADTAVYYC | Position 58-95 of SEQ ID No: 1 |
| | FR4: WGQGTLVTVSS | Position 113-123 of SEQ ID No: 1 |
| C3-V$_L$ | EIVLTQSPGTLSLSPGERATLSCRASQSVSSYLAWYQQKAGQA PRLLIYDASNRASGIPARFSGSGSGTDFTLTISSLEPEDFAVYYC QQRSNWPPTFGGGTKVEIK | SEQ ID No: 5 |
| Kobat | CDR1: RASQSVSSYLA | SEQ ID No: 6 |
| | CDR2: DASNRAS | SEQ ID No: 7 |
| | CDR3: QQRSNWPPT | SEQ ID No: 8 |
| | FR1: EIVLTQSPGTLSLSPGERATLSC | Position 1-23 of SEQ ID No: 5 |
| | FR2: WYQQKAGQAPRLLIY | Position 35-49 of SEQ ID No: 5 |
| | FR3: GIPARFSGSGSGTDFTLTISSLEPEDFAVYYC | Position 57-88 of SEQ ID No: 5 |
| | FR4: FGGGTKVEIK | Position 98-107 of SEQ ID No: 5 |
| IMGT | CDR1: QSVSSY | SEQ ID No: 12 |
| | CDR2: DA | Position 1-2 of SEQ ID No: 13; or Position 50-51 of SEQ ID No: 5 |
| | CDR3: QQRSNWPPT | SEQ ID No: 14 |
| | FR1: EIVLTQSPGTLSLSPGERATLSCRAS | Position 1-26 of SEQ ID No: 5 |

TABLE 1-continued

The amino acid sequence of the anti-ROR1 antibodies of clones C3, G3 and G6.

| Name or region | Sequence | SEQ ID No./ Position |
|---|---|---|
| | FR2: LAWYQQKAGQAPRLLIY | Position 33-49 of SEQ ID No: 5 |
| | FR3: SNRASGIPARFSGSGSGTDFTLTISSLEPEDFAVYYC | Position 52-88 of SEQ ID No: 5 |
| | FR4: FGGGTKVEIK | Position 98-107 of SEQ ID No: 5 |

G3

| Name or region | Sequence | SEQ ID No./ Position |
|---|---|---|
| G3-V$_H$ | QVQLQQWGAGLLKPSETLSLTCAVYGGSFSGYYWSWIRQPPG KGLEWIGEINHSGSTSYNPSLKSRVTISVDTSKNQFSLKLSSVTA ADTAVYYCARGHSSGWYRRYFDLWGRGTLVTVSS | SEQ ID No: 15 |
| Kobat | CDR1: GYYWS | SEQ ID No: 16 |
| | CDR2: EINHSGSTSYNPSLKS | SEQ ID No: 17 |
| | CDR3: GHSSGWYRRYFDL | SEQ ID No: 18 |
| | FR1: QVQLQQWGAGLLKPSETLSLTCAVYGGSFS | Position 1-30 of SEQ ID No: 15 |
| | FR2: WIRQPPGKGLEWIG | Position 36-49 of SEQ ID No: 15 |
| | FR3: RVTISVDTSKNQFSLKLSSVTAADTAVYYCAR | Position 66-97 of SEQ ID No: 15 |
| | FR4: WGRGTLVTVSS | Position 111-121 of SEQ ID No: 15 |
| IMGT | CDR1: GGSFSGYY | SEQ ID No: 23 |
| | CDR2: INHSGST | SEQ ID No: 24 |
| | CDR3: ARGHSSGWYRRYFDL | SEQ ID No: 25 |
| | FR1: QVQLQQWGAGLLKPSETLSLTCAVY | Position 1-25 of SEQ ID No: 15 |
| | FR2: WSWIRQPPGKGLEWIGE | Position 34-50 of SEQ ID No: 15 |
| | FR3: SYNPSLKSRVTISVDTSKNQFSLKLSSVTAADTAVYYC | Position 58-95 of SEQ ID No: 15 |
| | FR4: WGRGTLVTVSS | Position 111-121 of SEQ ID No: 15 |
| G3-V$_L$ | EIVLTQSPATLSLSPGERATLSCRASQSVSSYLAWYQQKPGQAP RLLIYDASNRATGIPAKFSGSGSGTDFTLTISSLEPEDFAVYYC QQRSNWPPTFGGGTKVEIK | SEQ ID No: 19 |
| Kobat | CDR1: RASQSVSSYLA | SEQ ID No: 20 |
| | CDR2: DASNRAT | SEQ ID No: 21 |
| | CDR3: QQRSNWPPT | SEQ ID No: 22 |
| | FR1: EIVLTQSPATLSLSPGERATLSC | Position 1-23 of SEQ ID No: 19 |
| | FR2: WYQQKPGQAPRLLIY | Position 35-49 of SEQ ID No: 19 |
| | FR3: GIPAKFSGSGSGTDFTLTISSLEPEDFAVYYC | Position 57-88 of SEQ ID No: 19 |
| | FR4: FGGGTKVEIK | Position 98-107 of SEQ ID No: 19 |

TABLE 1-continued

The amino acid sequence of the anti-ROR1 antibodies of clones C3, G3 and G6.

| Name or region | Sequence | SEQ ID No./Position |
|---|---|---|
| IMGT | CDR1: QSVSSY | SEQ ID No: 26 |
| | CDR2: DA | Position 1-2 of SEQ ID No:27; or Position 50-51 of SEQ ID No: 19 |
| | CDR3: QQRSNWPPT | SEQ ID No: 28 |
| | FR1: EIVLTQSPATLSLSPGERATLSCRAS | Position 1-26 of SEQ ID No: 19 |
| | FR2: LAWYQQKPGQAPRLLIY | Position 33-49 of SEQ ID No: 19 |
| | FR3: SNRATGIPAKFSGSGSGTDFTLTISSLEPEDFAVYYC | Position 52-88 of SEQ ID No: 19 |
| | FR4: FGGGTKVEIK | Position 98-107 of SEQ ID No: 19 |
| G6 | | |
| G6-V$_H$ | EVQLVESGGGVVQPGGSLRLSCAASGFTFDDYAMHWVRQAP GKGLEWVSLISGDGGSTYYADSVKGRFTISRDNAKNSLYLQM NSLRAEDTAVYYCARDNWNDVYYYGMDVWGQGTTVTVSS | SEQ ID No: 29 |
| Kobat | CDR1: DYAMH | SEQ ID No: 30 |
| | CDR2: LISGDGGSTYYADSVKG | SEQ ID No: 31 |
| | CDR3: DNWNDVYYYGMDV | SEQ ID No: 32 |
| | FR1: EVQLVESGGGVVQPGGSIRISCAASGFTFD | Position 1-30 of SEQ ID No: 29 |
| | FR2: WVRQAPGKGLEWVS | Position 36-49 of SEQ ID No: 29 |
| | FR3: RFTISRDNAKNSLYLQMNSLRAEDTAVYYCAR | Position 67-98 of SEQ ID No: 29 |
| | FR4: WGQGTTVTVSS | Position 113-123 of SEQ ID No: 29 |
| IMGT | CDR1: GFTFDDYA | SEQ ID No: 37 |
| | CDR2: ISGDGGST | SEQ ID No: 38 |
| | CDR3: ARDNWNDVYYYGMDV | SEQ ID No: 39 |
| | FR1: EVQLVESGGGVVQPGGSLRLSCAAS | Position 1-25 of SEQ ID No: 29 |
| | FR2: MHWVRQAPGKGLEWVSL | Position 34-50 of SEQ ID No: 29 |
| | FR3: YYADSVKGRFTISRDNAKNSLYLQMNSLRAEDTAVYYC | Position 59-96 of SEQ ID No: 29 |
| | FR4: WGQGTTVTVSS | Position 113-123 of SEQ ID No: 29 |
| G6-V$_L$ | DIQLTQSPSSLSASIGDTVTISCQASRDISDYLNWYQHKPGKAP KLLIYDASNLATGVPSRFSGSGSGTDFTLTIKSLQPEDVATYFC QQDDLLPLTFGGGTKVDIK | SEQ ID No: 33 |
| Kobat | CDR1: QASRDISDYLN | SEQ ID No: 34 |
| | CDR2: DASNLAT | SEQ ID No: 35 |
| | CDR3: QQDDLLPLT | SEQ ID No: 36 |

TABLE 1-continued

The amino acid sequence of the anti-ROR1 antibodies of clones C3, G3 and G6.

| Name or region | Sequence | SEQ ID No./ Position |
|---|---|---|
| | FR1: DIQLTQSPSSLSASIGDTVT1SC | Position 1-23 of SEQ ID No: 33 |
| | FR2: WYQHKPGKAPKLLIY | Position 35-49 of SEQ ID No: 33 |
| | FR3: GVPSRFSGSGSGTDFTLTIKSLQPEDVATYFC | Position 57-88 of SEQ ID No: 33 |
| | FR4: FQGGTKVDIK | Position 98-107 of SEQ ID No: 33 |
| IMGT | CDR1: RDISDY | SEQ ID No: 40 |
| | CDR2: DA | Position 1-2 of SEQ ID No: 41; or Position 50-51 of SEQ ID No: 33 |
| | CDR3: QQDDLLPLT | SEQ ID No: 42 |
| | FR1: DIQLTQSPSSLSASIGDTVTISCQAS | Position 1-26 of SEQ ID No: 33 |
| | FR2: LNWYQHKPGKAPKLLIY | Position 33-49 of SEQ ID No: 33 |
| | FR3: SNLATGVPSRFSGSGSGTDFTLTIKSLQPEDVATYFC | Position 52-88 of SEQ ID No: 33 |
| | FR4: FGGGTKVDIK | Position 98-107 of SEQ ID No: 33 |

TABLE 2

Sequence ID of $V_H$, $V_L$ and CDRs of antibodies

| | | Antibody | | |
|---|---|---|---|---|
| method | Region or CDR | C3 | G3 | G6 |
| | $V_H$ | SEQ ID No: 1 | SEQ ID No: 15 | SEQ ID No: 29 |
| Kobat | $V_H$-CDR1 | SEQ ID No: 2 | SEQ ID No: 16 | SEQ ID No: 30 |
| | $V_H$-CDR2 | SEQ ID No: 3 | SEQ ID No: 17 | SEQ ID No: 31 |
| | $V_H$-CDR3 | SEQ ID No: 4 | SEQ ID No: 18 | SEQ ID No: 32 |
| IMGT | $V_H$-CDR1 | SEQ ID No: 9 | SEQ ID No: 23 | SEQ ID No: 37 |
| | $V_H$-CDR2 | SEQ ID No: 10 | SEQ ID No: 24 | SEQ ID No: 38 |
| | $V_H$-CDR3 | SEQ ID No: 11 | SEQ ID No: 25 | SEQ ID No: 39 |
| | $V_L$ | SEQ ID No: 5 | SEQ ID No: 19 | SEQ ID No: 33 |
| Kobat | $V_L$-CDR1 | SEQ ID No: 6 | SEQ ID No: 20 | SEQ ID No: 34 |
| | $V_L$-CDR2 | SEQ ID No: 7 | SEQ ID No: 21 | SEQ ID No: 35 |
| | $V_L$-CDR3 | SEQ ID No: 8 | SEQ ID No: 22 | SEQ ID No: 36 |
| IMGT | $V_L$-CDR1 | SEQ ID No: 12 | SEQ ID No: 26 | SEQ ID No: 40 |
| | $V_L$-CDR2 | Position 1-2 of SEQ ID No: 13; or Position 50-51 of SEQ ID No: 5 | Position 1-2 of SEQ ID No: 27; or Position 50-51 of SEQ ID No: 19 | Position 1-2 of SEQ ID No: 41; or Position 50-51 of SEQ ID No: 33 |
| | $V_L$-CDR3 | SEQ ID No: 14 | SEQ ID No: 28 | SEQ ID No: 42 |

Example 2. ROR1 Antibodies Crossly Bind with Human and Murine ROR1

Figure 2A:
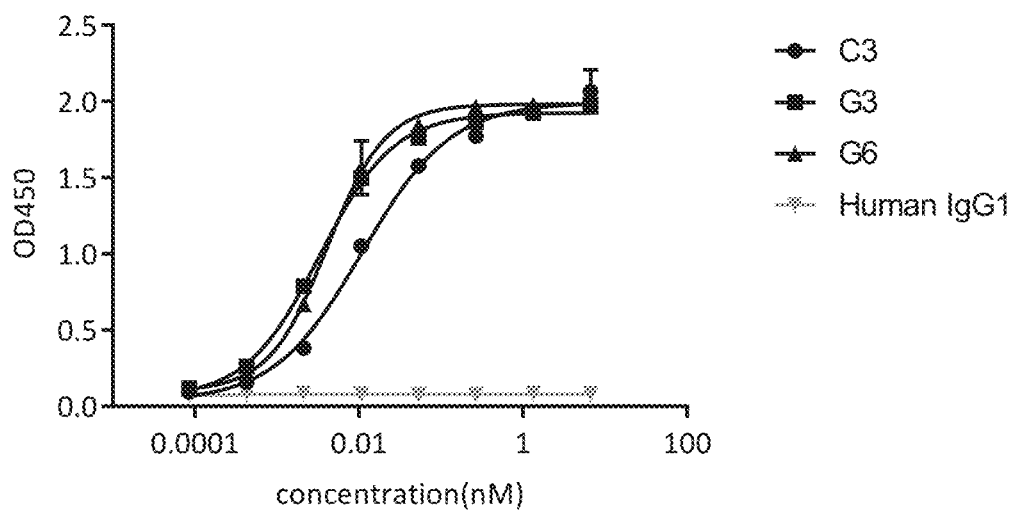
FIG. 2A depicts that antibodies have binding ability to human ROR1.
Figure 2B:
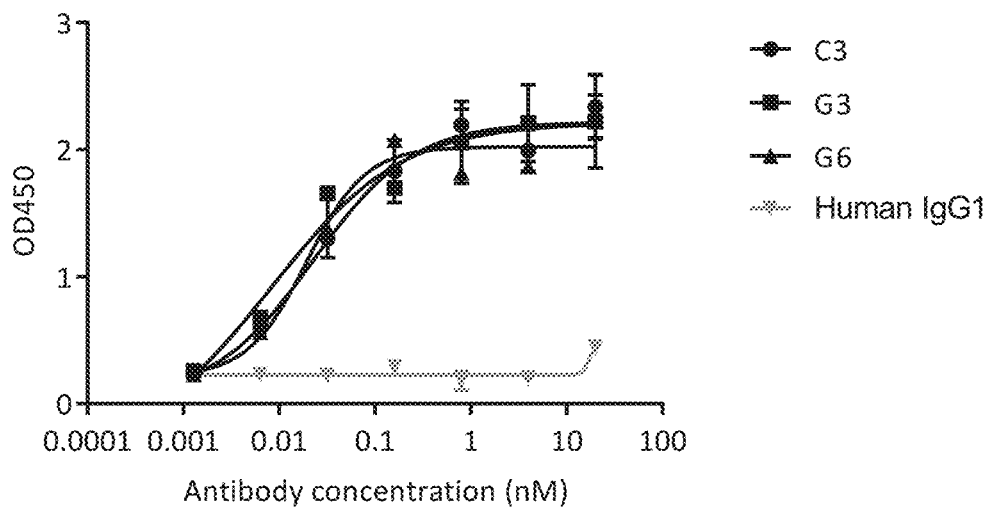
FIG. 2B depicts that antibodies also have binding ability to murine ROR1.

$V_H$ and $V_L$ sequences from different clones screened from the human phage library are cloned to pCDNA 3.1 vector and full length human IgG1 antibodies were generated. An ELISA plate was coated with human ROR1 or mouse ROR1 (100 ng per well) at 4° C. overnight, then blocked with 2% BSA-PBS at room temperature for 1 hour, and subsequently contacted with dilutions of affinity purified of human mAb at room temperature for 1 hour. After washing with PBS-Tween 20, horseradish peroxidase (HRP)-conjugated goat anti-human IgG (1:10000 dilution, ab97225) was added and incubated at room temperature for 1 hour, and then washed. The bound antibody was detected using the peroxidase substrate TMB (3,3',5,5'-Tetramethylbenzidine) (Sangon Biotech, C520026). It was determined that these antibodies bound not only human ROR1 but also cross react with murine ROR1 (FIG. 2).

Example 3. Binding Ability Test of ROR Antibodies Against ROR1 Expressing Cell Lines CHO-K1 cell line was transduced with lentivector carrying human ROR1. CHO-K1-ROR1 cells were resuspended in FACS buffer and Fc receptors were blocked prior to incubation with purified ROR1 mAbs. $5\times10^5$ cells in 100 μL FACS buffer were aliquoted to separate tubes and the purified mAb was added. Antibody concentration is from about 30 μg/mL to about 0.000508 μg/mL. Cells were incubated at 4 degrees for 1 hour, then washed twice with excess FACS buffer. Cells were resuspended in 100 μL FACS buffer and 0.5 μg of anti-human IgG-Fc (PE) secondary antibody (ab98596) was added to samples, incubated for 30 minutes and washed twice with excess FACS buffer. Results showed that these antibodies bind with human ROR1 expressed CHO-K1 cells (FIG. 3).

Example 4. Determine the $K_D$ Values of ROR1 Antibodies

The affinity of the anti-ROR1 antibodies were determined using Fortebio instrument (Fortebio Octet RED96). Human ROR1-ECD was diluted in KB buffer (0.1% BSA, 0.05% Tween 20, 1×PBS, pH 7.4) to various concentrations (from about 500 nM to about 62.5 nM), and the mAb was also diluted in KB buffer to 10 μg/mL. The mAb was loading to anti-hIgG Fc Capture (AHC) Biosensors (PALL, Fortebio), and the diluted Human ROR1-ECD was associated with Mab, then dissociated in KB buffer. Association (k-on) and dissociation (k-off) rate constants were calculated based on a 1:1 Langmuir binding model using Fortebio Date Analysis 7.1 software (PALL, Fortebio).

Figures 3, 4:
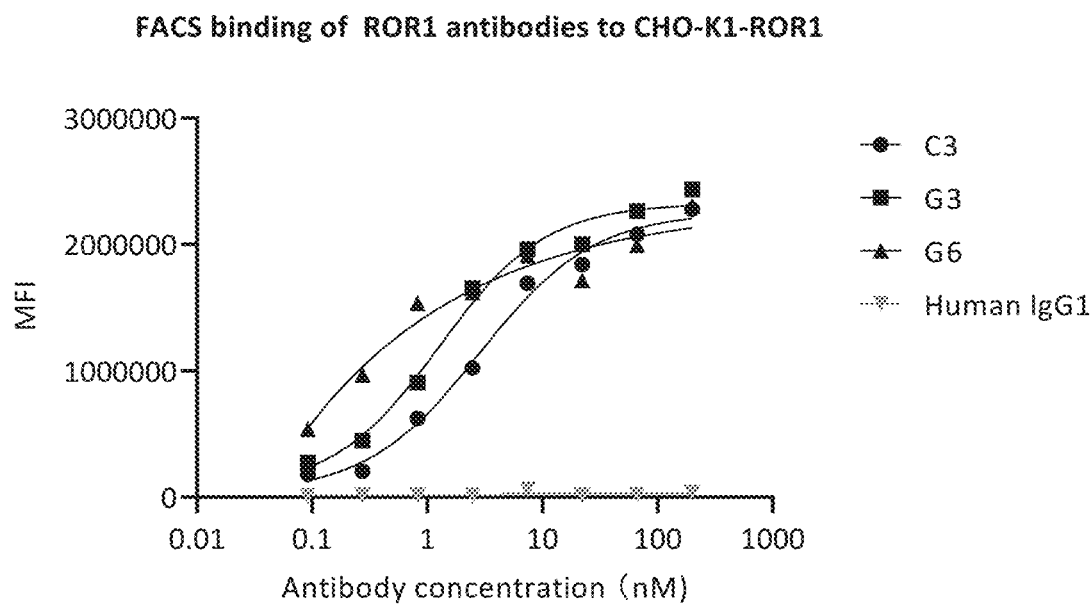
FIG. 3 shows the result of a FACS binding analysis using CHO-K1-ROR1.
FIG. 4 indicates the $K_D$ values for ROR1 antibodies using Fortebio.

The affinity of these three clones for human ROR1 is showed in FIG. 4.

Example 5. Epitope Mapping of the Interaction Between Anti-ROR1 Antibodies and ROR1

Figure 5A:
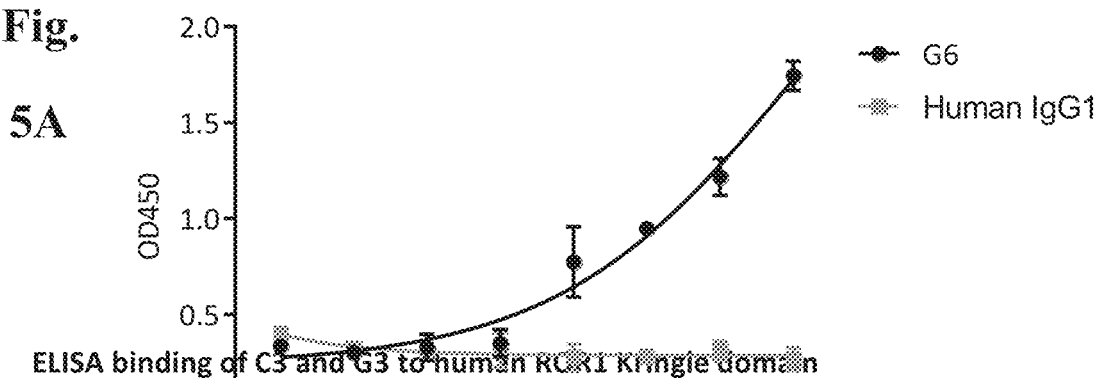
FIG. 5A depicts that antibody clone G6 binds to the Ig-like domain of ROR1.
Figure 5B:
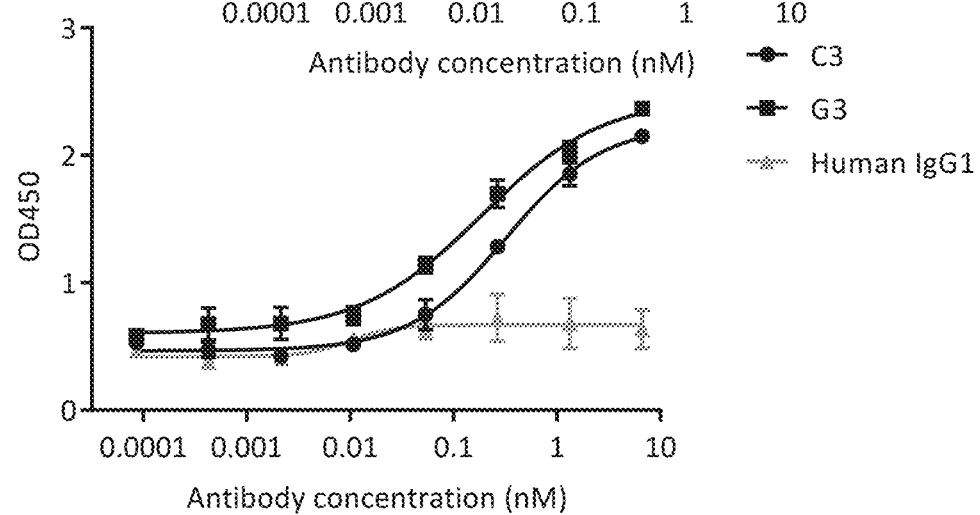
FIG. 5B depicts that antibody clone C3 and G3 bind to the Kringle domain of ROR1.

An ELISA plate was coated with mouse anti-his antibody (GenScript, A00186) (100 ng per well overnight at 4° C.), then blocked with 2% BSA-PBS at room temperature for 1 hours. Subsequently, Ig-like domain, Frizzled or Kringle domain of human ROR1 (Acro, RO1-H5221, RO1-H5222, RO1-H5223) was added on the ELISA plate and incubated for 1 hour at room temperature. After washed with PBS-Tween 20, the human mAbs B6 and C3 were added and incubated for 1 hour at room temperature. After washed with PBS-Tween 20, antibodies were incubated with HRP-conjugated goat anti-human IgG Fc polyclonal antibodies (ab98596) for 1 hour at room temperature. After washed with PBS-Tween 20, horseradish peroxidase (HRP)-conjugated goat anti-human (Biolegend, 652504) was added and incubated for 1 hour at room temperature, then washed with PBS-Tween 20. The bound antibody was detected using the peroxidase substrate TMB (3,3',5,5'-Tetramethylbenzidine) (Sangon Biotech, C520026). The results showed that C3 and G3 bind to the Kringle domain of ROR1 and G6 binds to the Ig-like domain of ROR1 (FIG. 5).

Example 6. The Anti-Cancer Effect of Anti-ROR1

Figure 12:
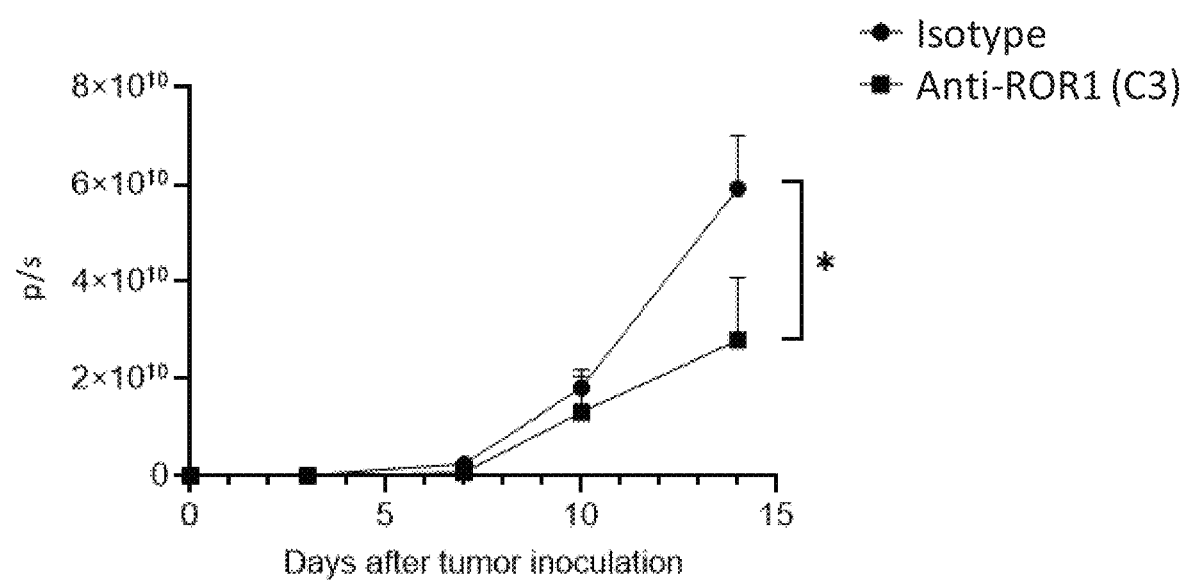
FIG. 12 shows the result of antitumor activity of anti-ROR1 antibody clone C3.

NOD.Cg-Prkdc$^{scid}$ Il2rg$^{tm1Wjl}$/SzJ (NSG) mice were inoculated with 3×10$^6$ Jeko-1-Luc cells via the caudal vein. Three days after the inoculation, 10 mg/kg anti-ROR1 (clone C3) or isotype antibody (control) were injected i.v. The antibody treatment was performed every 3 days. To measure tumor burden, mice were placed in the imaging chamber of the PhotonIMAGER Optima system (Biospace labs). A color-scale photograph of the animals was acquired, followed by bioluminescent acquisition. Regions of interest were drawn over the animal image, as well as over regions of no signal, which were used as background readings. Light intensity was quantified using photons/s (RLU). The color-scale photograph and data images from all studies were superimposed using M3 Vision software (Biospace labs). The result showed that the anti-ROR1 (clone C3) significantly inhibited Jeko-1 growth compared to the isotype control (FIG. 12).

All the documents mentioned in the present invention are incorporated in the present application by reference to the same extent as if each individual document is specifically and individually indicated to be incorporated by reference. In addition, it should be understood that after reading the contents taught in the present invention, various modifications and changes may be made to the present invention by those skilled in the art, and these equivalents also fall into the scope defined by the claims.

What is claimed:

1. An isolated monoclonal antibody or antigen-binding fragment thereof which comprises a heavy chain complementarity determining region 1 (HCDR1), HCDR2, HCDR3, a light chain complementarity determining region1 (LCDR1), LCDR2, and LCDR3, wherein the polypeptide sequences of HCDR1, HCDR2, HCDR3, LCDR1, LCDR2, and LCDR3 are selected from the group consisting of:
   a. SEQ ID NOs: 2, 3, 4, 6, 7 and 8, respectively; or
   b. SEQ ID NOs: 16, 17, 18, 20, 21 and 22, respectively; or
   c. SEQ ID NOs: 30, 31, 32, 34, 35 and 36, respectively;
   d. SEQ ID NOs: 9, 10, 11, 12, position 1-2 of SEQ ID No: 13, and SEQ ID No: 14; or
   e. SEQ ID NOs: 23, 24, 25, 26, position 1-2 of SEQ ID No: 27, and SEQ ID No: 28, respectively; or
   f. SEQ ID NOs: 37, 38, 39, 40, position 1-2 of SEQ ID No: 41, and SEQ ID No: 42, respectively;
   wherein the antibody or antigen-binding fragment thereof specifically binds ROR1.

2. The antibody of claim 1, wherein the polypeptide sequences of the isolated monoclonal antibody or antigen-binding fragment thereof have selected from the group consisting of:
   a. a heavy chain variable region having the polypeptide sequence of SEQ ID NO: 1, and a light chain variable region having the polypeptide sequence of SEQ ID NO: 5; or
   b. a heavy chain variable region having the polypeptide sequence of SEQ ID NO: 15, and a light chain variable region having the polypeptide sequence of SEQ ID NO: 19; or
   c. a heavy chain variable region having the polypeptide sequence of SEQ ID NO: 29, and a light chain variable region having the polypeptide sequence of SEQ ID NO: 33.

3. The antibody of claim 1, wherein the isolated monoclonal antibody or antigen-binding fragment thereof is human or humanized.

4. The antibody of claim 1, wherein the antibody is an ROR1 specific antibody capable of binding Ig-like or Kringle domain of ROR1.

5. The antibody of claim 1, wherein the ROR1 specific antibody is selected from the group consisting of: (i) a single chain antibody, a single-chain variable fragment (scFv), a univalent antibody lacking a hinge region or a minibody; (ii) a Fab, Fab' or F(ab')$_2$ fragment; (iii) a whole antibody; and (iv) an antibody that comprises a human IgG Fc domain.

6. An antibody conjugate which comprises:
   (i) an antibody moiety selected from the group consisting of an antibody or antigen-binding fragment thereof of claim 1; and
   (ii) a coupling moiety coupled to the antibody moiety, wherein the coupling moiety is selected from the group consisting of a detectable label, a drug, a toxin, a cytokine, a radionuclide, an enzyme, or a combination thereof.

7. An immune cell which expresses an antibody or antigen-binding fragment thereof of claim 1.

8. The immune cell of claim 7 wherein the antibody is exposed as a cell membrane protein in which the antibody is an extracellular element.

9. A pharmaceutical composition which comprises (i) the isolated monoclonal antibody or antigen-binding fragment thereof of claim 1, and (ii) a pharmaceutically acceptable carrier.

10. A method for (a) preparation of a diagnostic reagent or kit; and/or (b) preparation of a medicament for the prevention and/or treatment of a disease associated with abnormal expression or function of ROR1 comprising using an active ingredient, wherein the active ingredient is selected from the isolated monoclonal antibody or antigen-binding fragment thereof of claim 1.

11. The method of claim 10 wherein the disease is chronic lymphocyte leukemia (CLL) or acute lymphocytic leukemia (ALL).

12. The method of claim 10 wherein the disease comprises breast cancer, prostate cancer, liver cancer, lung cancer, pancreatic cancer, colon cancer, melanoma, ovarian cancer, or kidney cancer.

13. A method for in vitro detection of a ROR1 protein in a sample which comprises:
   (i) contacting the sample in vitro with an antibody of claim 1; and
   (ii) detecting whether an antigen-antibody complex is formed, where the formation of the complex indicates the presence of ROR1 protein in the sample.

14. A kit which comprises:
   (i) a first container containing the antibody of claim 1 as a first antibody; and
   (ii) a second container containing a secondary antibody against the first antibody.

15. A combination of medicine which comprises:
   (i) a first active ingredient, which is selected from the group consisting of the isolated monoclonal antibody or antigen-binding fragment thereof of claim 1;

(ii) a second active ingredient which is a second antibody, or a chemotherapeutic agent.

16. A method for treating a disease associated with abnormal expression or dysfunction of ROR1, which comprises administering an effective amount of the isolated monoclonal antibody or antigen-binding fragment thereof of claim 1 to a subject in need.

17. The method of claim 16 wherein the disease associated with abnormal expression or dysfunction of ROR1 is cancer.

18. A method of determining a level of ROR1 in a subject which comprise (a) obtaining a sample from the subject; (b) contacting the sample with an isolated monoclonal antibody or antigen-binding fragment thereof of claim 1; and (c) determining a level of ROR1 in the subject.

19. The antibody of claim 1, wherein the polypeptide sequences of HCDR1, HCDR2, HCDR3, LCDR1, LCDR2, and LCDR3 are SEQ ID NOs: 16, 17, 18, 20, 21 and 22, respectively.

20. The antibody of claim 1, comprising a heavy chain variable region having the polypeptide sequence of SEQ ID NO: 15, and a light chain variable region having the polypeptide sequence of SEQ ID NO: 19.

* * * * *

SEQUENCE LISTING

<160> NUMBER OF SEQ ID NOS: 42

<210> SEQ ID NO 1
<211> LENGTH: 123
<212> TYPE: PRT
<213> ORGANISM: Artificial Sequence
<220> FEATURE:
<223> OTHER INFORMATION: VH of antibody C3

<400> SEQUENCE: 1

Gln Val Gln Leu Gln Glu Ser Gly Pro Gly Leu Val Lys Pro Ser Glu
1               5                   10                  15

Thr Leu Ser Leu Thr Cys Thr Val Ser Gly Gly Ser Ile Ser Ser Tyr
            20                  25                  30

Tyr Trp Ser Trp Ile Arg Gln Leu Pro Gly Lys Gly Leu Glu Trp Ile
        35                  40                  45

Gly Tyr Met His Tyr Ser Gly Ser Thr Ser Tyr Asn Pro Ser Leu Lys
    50                  55                  60

Gly Arg Leu Thr Ile Ser Val Asp Thr Ser Thr Asn Gln Phe Ser Leu
65                  70                  75                  80

Lys Leu Gly Ser Val Thr Ala Ala Asp Thr Ala Val Tyr Tyr Cys Ala
                85                  90                  95

Arg Tyr Tyr His Asp Ser Ser Gly Tyr Tyr Ser Tyr Phe Asp Tyr
                100                 105                 110

Trp Gly Gln Gly Thr Leu Val Thr Val Ser Ser
            115                 120

```
<210> SEQ ID NO 2
<211> LENGTH: 5
<212> TYPE: PRT
<213> ORGANISM: Artificial Sequence
<220> FEATURE:
<223> OTHER INFORMATION: VH-CDR1

<400> SEQUENCE: 2

Ser Tyr Tyr Trp Ser
1               5

<210> SEQ ID NO 3
<211> LENGTH: 16
<212> TYPE: PRT
<213> ORGANISM: Artificial Sequence
<220> FEATURE:
<223> OTHER INFORMATION: VH-CDR2

<400> SEQUENCE: 3

Tyr Met His Tyr Ser Gly Ser Thr Ser Tyr Asn Pro Ser Leu Lys Gly
1               5                   10                  15

<210> SEQ ID NO 4
<211> LENGTH: 15
<212> TYPE: PRT
<213> ORGANISM: Artificial Sequence
<220> FEATURE:
<223> OTHER INFORMATION: VH-CDR3

<400> SEQUENCE: 4

Tyr Tyr Tyr His Asp Ser Ser Gly Tyr Tyr Ser Tyr Phe Asp Tyr
1               5                   10                  15

<210> SEQ ID NO 5
<211> LENGTH: 107
<212> TYPE: PRT
<213> ORGANISM: Artificial Sequence
<220> FEATURE:
<223> OTHER INFORMATION: VL of antibody C3

<400> SEQUENCE: 5

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Ser Ser Tyr
                20                  25                  30

Leu Ala Trp Tyr Gln Gln Lys Ala Gly Gln Ala Pro Arg Leu Leu Ile
            35                  40                  45

Tyr Asp Ala Ser Asn Arg Ala Ser Gly Ile Pro Ala Arg Phe Ser Gly
        50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Pro Pro
                85                  90                  95

Thr Phe Gly Gly Gly Thr Lys Val Glu Ile Lys
            100                 105

<210> SEQ ID NO 6
<211> LENGTH: 11
<212> TYPE: PRT
<213> ORGANISM: Artificial Sequence
<220> FEATURE:
<223> OTHER INFORMATION: VL-CDR1

<400> SEQUENCE: 6
```

```
Arg Ala Ser Gln Ser Val Ser Ser Tyr Leu Ala
1               5                   10

<210> SEQ ID NO 7
<211> LENGTH: 7
<212> TYPE: PRT
<213> ORGANISM: Artificial Sequence
<220> FEATURE:
<223> OTHER INFORMATION: VL-CDR2

<400> SEQUENCE: 7

Asp Ala Ser Asn Arg Ala Ser
1               5

<210> SEQ ID NO 8
<211> LENGTH: 9
<212> TYPE: PRT
<213> ORGANISM: Artificial Sequence
<220> FEATURE:
<223> OTHER INFORMATION: VL-CDR3

<400> SEQUENCE: 8

Gln Gln Arg Ser Asn Trp Pro Pro Thr
1               5

<210> SEQ ID NO 9
<211> LENGTH: 8
<212> TYPE: PRT
<213> ORGANISM: Artificial Sequence
<220> FEATURE:
<223> OTHER INFORMATION: VH-CDR1

<400> SEQUENCE: 9

Gly Gly Ser Ile Ser Ser Tyr Tyr
1               5

<210> SEQ ID NO 10
<211> LENGTH: 7
<212> TYPE: PRT
<213> ORGANISM: Artificial Sequence
<220> FEATURE:
<223> OTHER INFORMATION: VH-CDR2

<400> SEQUENCE: 10

Met His Tyr Ser Gly Ser Thr
1               5

<210> SEQ ID NO 11
<211> LENGTH: 17
<212> TYPE: PRT
<213> ORGANISM: Artificial Sequence
<220> FEATURE:
<223> OTHER INFORMATION: VH-CDR3

<400> SEQUENCE: 11

Ala Arg Tyr Tyr Tyr His Asp Ser Ser Gly Tyr Tyr Ser Tyr Phe Asp
1               5                   10                  15

Tyr

<210> SEQ ID NO 12
<211> LENGTH: 6
<212> TYPE: PRT
<213> ORGANISM: Artificial Sequence
<220> FEATURE:
<223> OTHER INFORMATION: VL-CDR1

<400> SEQUENCE: 12
```

```
Gln Ser Val Ser Ser Tyr
1               5

<210> SEQ ID NO 13
<211> LENGTH: 39
<212> TYPE: PRT
<213> ORGANISM: Artificial Sequence
<220> FEATURE:
<223> OTHER INFORMATION: VL-CDR2 and FR3 of VL

<400> SEQUENCE: 13

Asp Ala Ser Asn Arg Ala Ser Gly Ile Pro Ala Arg Phe Ser Gly Ser
1               5                   10                  15

Gly Ser Gly Thr Asp Phe Thr Leu Thr Ile Ser Ser Leu Glu Pro Glu
            20                  25                  30

Asp Phe Ala Val Tyr Tyr Cys
        35

<210> SEQ ID NO 14
<211> LENGTH: 9
<212> TYPE: PRT
<213> ORGANISM: Artificial Sequence
<220> FEATURE:
<223> OTHER INFORMATION: VL-CDR3

<400> SEQUENCE: 14

Gln Gln Arg Ser Asn Trp Pro Pro Thr
1               5

<210> SEQ ID NO 15
<211> LENGTH: 121
<212> TYPE: PRT
<213> ORGANISM: Artificial Sequence
<220> FEATURE:
<223> OTHER INFORMATION: VH of antibody G3

<400> SEQUENCE: 15

Gln Val Gln Leu Gln Gln Trp Gly Ala Gly Leu Leu Lys Pro Ser Glu
1               5                   10                  15

Thr Leu Ser Leu Thr Cys Ala Val Tyr Gly Gly Ser Phe Ser Gly Tyr
            20                  25                  30

Tyr Trp Ser Trp Ile Arg Gln Pro Pro Gly Lys Gly Leu Glu Trp Ile
        35                  40                  45

Gly Glu Ile Asn His Ser Gly Ser Thr Ser Tyr Asn Pro Ser Leu Lys
    50                  55                  60

Ser Arg Val Thr Ile Ser Val Asp Thr Ser Lys Asn Gln Phe Ser Leu
65                  70                  75                  80

Lys Leu Ser Ser Val Thr Ala Ala Asp Thr Ala Val Tyr Tyr Cys Ala
                85                  90                  95

Arg Gly His Ser Ser Gly Trp Tyr Arg Arg Tyr Phe Asp Leu Trp Gly
            100                 105                 110

Arg Gly Thr Leu Val Thr Val Ser Ser
            115                 120

<210> SEQ ID NO 16
<211> LENGTH: 5
<212> TYPE: PRT
<213> ORGANISM: Artificial Sequence
<220> FEATURE:
<223> OTHER INFORMATION: VH-CDR1

<400> SEQUENCE: 16
```

```
Gly Tyr Tyr Trp Ser
1               5

<210> SEQ ID NO 17
<211> LENGTH: 16
<212> TYPE: PRT
<213> ORGANISM: Artificial Sequence
<220> FEATURE:
<223> OTHER INFORMATION: VH-CDR2

<400> SEQUENCE: 17

Glu Ile Asn His Ser Gly Ser Thr Ser Tyr Asn Pro Ser Leu Lys Ser
1               5                   10                  15

<210> SEQ ID NO 18
<211> LENGTH: 13
<212> TYPE: PRT
<213> ORGANISM: Artificial Sequence
<220> FEATURE:
<223> OTHER INFORMATION: VH-CDR3

<400> SEQUENCE: 18

Gly His Ser Ser Gly Trp Tyr Arg Arg Tyr Phe Asp Leu
1               5                   10

<210> SEQ ID NO 19
<211> LENGTH: 107
<212> TYPE: PRT
<213> ORGANISM: Artificial Sequence
<220> FEATURE:
<223> OTHER INFORMATION: VL of antibody G3

<400> SEQUENCE: 19

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Lys Phe Ser Gly
50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Arg Ser Asn Trp Pro Pro
                85                  90                  95

Thr Phe Gly Gly Gly Thr Lys Val Glu Ile Lys
            100                 105

<210> SEQ ID NO 20
<211> LENGTH: 11
<212> TYPE: PRT
<213> ORGANISM: Artificial Sequence
<220> FEATURE:
<223> OTHER INFORMATION: VL-CDR1

<400> SEQUENCE: 20

Arg Ala Ser Gln Ser Val Ser Ser Tyr Leu Ala
1               5                   10

<210> SEQ ID NO 21
<211> LENGTH: 7
<212> TYPE: PRT
<213> ORGANISM: Artificial Sequence
```

```
<220> FEATURE:
<223> OTHER INFORMATION: VL-CDR2

<400> SEQUENCE: 21

Asp Ala Ser Asn Arg Ala Thr
1               5

<210> SEQ ID NO 22
<211> LENGTH: 9
<212> TYPE: PRT
<213> ORGANISM: Artificial Sequence
<220> FEATURE:
<223> OTHER INFORMATION: VL-CDR3

<400> SEQUENCE: 22

Gln Gln Arg Ser Asn Trp Pro Pro Thr
1               5

<210> SEQ ID NO 23
<211> LENGTH: 8
<212> TYPE: PRT
<213> ORGANISM: Artificial Sequence
<220> FEATURE:
<223> OTHER INFORMATION: VH-CDR1

<400> SEQUENCE: 23

Gly Gly Ser Phe Ser Gly Tyr Tyr
1               5

<210> SEQ ID NO 24
<211> LENGTH: 7
<212> TYPE: PRT
<213> ORGANISM: Artificial Sequence
<220> FEATURE:
<223> OTHER INFORMATION: VH-CDR2

<400> SEQUENCE: 24

Ile Asn His Ser Gly Ser Thr
1               5

<210> SEQ ID NO 25
<211> LENGTH: 15
<212> TYPE: PRT
<213> ORGANISM: Artificial Sequence
<220> FEATURE:
<223> OTHER INFORMATION: VH-CDR3

<400> SEQUENCE: 25

Ala Arg Gly His Ser Ser Gly Trp Tyr Arg Arg Tyr Phe Asp Leu
1               5                   10                  15

<210> SEQ ID NO 26
<211> LENGTH: 6
<212> TYPE: PRT
<213> ORGANISM: Artificial Sequence
<220> FEATURE:
<223> OTHER INFORMATION: VL-CDR1

<400> SEQUENCE: 26

Gln Ser Val Ser Ser Tyr
1               5

<210> SEQ ID NO 27
<211> LENGTH: 39
<212> TYPE: PRT
<213> ORGANISM: Artificial Sequence
<220> FEATURE:
```

<223> OTHER INFORMATION: VL-CDR2 and FR3 of VL

<400> SEQUENCE: 27

Asp Ala Ser Asn Arg Ala Thr Gly Ile Pro Ala Lys Phe Ser Gly Ser
1               5                   10                  15
Gly Ser Gly Thr Asp Phe Thr Leu Thr Ile Ser Ser Leu Glu Pro Glu
            20                  25                  30
Asp Phe Ala Val Tyr Tyr Cys
        35

<210> SEQ ID NO 28
<211> LENGTH: 9
<212> TYPE: PRT
<213> ORGANISM: Artificial Sequence
<220> FEATURE:
<223> OTHER INFORMATION: VL-CDR3

<400> SEQUENCE: 28

Gln Gln Arg Ser Asn Trp Pro Pro Thr
1               5

<210> SEQ ID NO 29
<211> LENGTH: 123
<212> TYPE: PRT
<213> ORGANISM: Artificial Sequence
<220> FEATURE:
<223> OTHER INFORMATION: VH of antibody G6

<400> SEQUENCE: 29

Glu Val Gln Leu Val Glu Ser Gly Gly Gly Val Val Gln Pro Gly Gly
1               5                   10                  15
Ser Leu Arg Leu Ser Cys Ala Ala Ser Gly Phe Thr Phe Asp Asp Tyr
            20                  25                  30
Ala Met His Trp Val Arg Gln Ala Pro Gly Lys Gly Leu Glu Trp Val
        35                  40                  45
Ser Leu Ile Ser Gly Asp Gly Ser Thr Tyr Tyr Ala Asp Ser Val
    50                  55                  60
Lys Gly Arg Phe Thr Ile Ser Arg Asp Asn Ala Lys Asn Ser Leu Tyr
65                  70                  75                  80
Leu Gln Met Asn Ser Leu Arg Ala Glu Asp Thr Ala Val Tyr Tyr Cys
                85                  90                  95
Ala Arg Asp Asn Trp Asn Asp Val Tyr Tyr Tyr Gly Met Asp Val
            100                 105                 110
Trp Gly Gln Gly Thr Thr Val Thr Val Ser Ser
        115                 120

<210> SEQ ID NO 30
<211> LENGTH: 5
<212> TYPE: PRT
<213> ORGANISM: Artificial Sequence
<220> FEATURE:
<223> OTHER INFORMATION: VH-CDR1

<400> SEQUENCE: 30

Asp Tyr Ala Met His
1               5

<210> SEQ ID NO 31
<211> LENGTH: 17
<212> TYPE: PRT
<213> ORGANISM: Artificial Sequence
<220> FEATURE:

```
<223> OTHER INFORMATION: VH-CDR2

<400> SEQUENCE: 31

Leu Ile Ser Gly Asp Gly Gly Ser Thr Tyr Tyr Ala Asp Ser Val Lys
1               5                   10                  15

Gly

<210> SEQ ID NO 32
<211> LENGTH: 14
<212> TYPE: PRT
<213> ORGANISM: Artificial Sequence
<220> FEATURE:
<223> OTHER INFORMATION: VH-CDR3

<400> SEQUENCE: 32

Asp Asn Trp Asn Asp Val Tyr Tyr Tyr Gly Met Asp Val
1               5                   10

<210> SEQ ID NO 33
<211> LENGTH: 107
<212> TYPE: PRT
<213> ORGANISM: Artificial Sequence
<220> FEATURE:
<223> OTHER INFORMATION: VL of antibody G3

<400> SEQUENCE: 33

Asp Ile Gln Leu Thr Gln Ser Pro Ser Ser Leu Ser Ala Ser Ile Gly
1               5                   10                  15

Asp Thr Val Thr Ile Ser Cys Gln Ala Ser Arg Asp Ile Ser Asp Tyr
            20                  25                  30

Leu Asn Trp Tyr Gln His Lys Pro Gly Lys Ala Pro Lys Leu Leu Ile
        35                  40                  45

Tyr Asp Ala Ser Asn Leu Ala Thr Gly Val Pro Ser Arg Phe Ser Gly
    50                  55                  60

Ser Gly Ser Gly Thr Asp Phe Thr Leu Thr Ile Lys Ser Leu Gln Pro
65                  70                  75                  80

Glu Asp Val Ala Thr Tyr Phe Cys Gln Gln Asp Asp Leu Leu Pro Leu
                85                  90                  95

Thr Phe Gly Gly Gly Thr Lys Val Asp Ile Lys
            100                 105

<210> SEQ ID NO 34
<211> LENGTH: 11
<212> TYPE: PRT
<213> ORGANISM: Artificial Sequence
<220> FEATURE:
<223> OTHER INFORMATION: VL-CDR1

<400> SEQUENCE: 34

Gln Ala Ser Arg Asp Ile Ser Asp Tyr Leu Asn
1               5                   10

<210> SEQ ID NO 35
<211> LENGTH: 7
<212> TYPE: PRT
<213> ORGANISM: Artificial Sequence
<220> FEATURE:
<223> OTHER INFORMATION: VL-CDR2

<400> SEQUENCE: 35

Asp Ala Ser Asn Leu Ala Thr
1               5
```

<210> SEQ ID NO 36
<211> LENGTH: 9
<212> TYPE: PRT
<213> ORGANISM: Artificial Sequence
<220> FEATURE:
<223> OTHER INFORMATION: VL-CDR3

<400> SEQUENCE: 36

Gln Gln Asp Asp Leu Leu Pro Leu Thr
1               5

<210> SEQ ID NO 37
<211> LENGTH: 8
<212> TYPE: PRT
<213> ORGANISM: Artificial Sequence
<220> FEATURE:
<223> OTHER INFORMATION: VH-CDR1

<400> SEQUENCE: 37

Gly Phe Thr Phe Asp Asp Tyr Ala
1               5

<210> SEQ ID NO 38
<211> LENGTH: 8
<212> TYPE: PRT
<213> ORGANISM: Artificial Sequence
<220> FEATURE:
<223> OTHER INFORMATION: VH-CDR2

<400> SEQUENCE: 38

Ile Ser Gly Asp Gly Gly Ser Thr
1               5

<210> SEQ ID NO 39
<211> LENGTH: 16
<212> TYPE: PRT
<213> ORGANISM: Artificial Sequence
<220> FEATURE:
<223> OTHER INFORMATION: VH-CDR3

<400> SEQUENCE: 39

Ala Arg Asp Asn Trp Asn Asp Val Tyr Tyr Tyr Gly Met Asp Val
1               5                   10                  15

<210> SEQ ID NO 40
<211> LENGTH: 6
<212> TYPE: PRT
<213> ORGANISM: Artificial Sequence
<220> FEATURE:
<223> OTHER INFORMATION: VL-CDR1

<400> SEQUENCE: 40

Arg Asp Ile Ser Asp Tyr
1               5

<210> SEQ ID NO 41
<211> LENGTH: 39
<212> TYPE: PRT
<213> ORGANISM: Artificial Sequence
<220> FEATURE:
<223> OTHER INFORMATION: VL-CDR2 and FR3 of VL

<400> SEQUENCE: 41

Asp Ala Ser Asn Leu Ala Thr Gly Val Pro Ser Arg Phe Ser Gly
1               5                   10                  15

Gly Ser Gly Thr Asp Phe Thr Leu Thr Ile Lys Ser Leu Gln Pro Glu

```
                    20                  25                  30

Asp Val Ala Thr Tyr Phe Cys
        35

<210> SEQ ID NO 42
<211> LENGTH: 9
<212> TYPE: PRT
<213> ORGANISM: Artificial Sequence
<220> FEATURE:
<223> OTHER INFORMATION: VL-CDR3

<400> SEQUENCE: 42

Gln Gln Asp Asp Leu Leu Pro Leu Thr
1               5
```